(12) United States Patent
Motegi et al.

(10) Patent No.: US 7,590,085 B2
(45) Date of Patent: Sep. 15, 2009

(54) MOBILE COMMUNICATION SYSTEM, LINE CONCENTRATOR, RADIO BASE STATION, MOBILE STATION, AND COMMUNICATION METHOD

(75) Inventors: Masayuki Motegi, Tokyo (JP); Hideki Tobe, Tokyo (JP); Hidetoshi Kayama, Tokyo (JP); Narumi Umeda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 676 days.

(21) Appl. No.: 10/534,754

(22) PCT Filed: Nov. 18, 2003

(86) PCT No.: PCT/JP03/14655

§ 371 (c)(1),
(2), (4) Date: Oct. 18, 2005

(87) PCT Pub. No.: WO2004/047474

PCT Pub. Date: Jun. 3, 2004

(65) Prior Publication Data

US 2006/0126554 A1    Jun. 15, 2006

(30) Foreign Application Priority Data

Nov. 19, 2002  (JP) .............................. 2002-335720

(51) Int. Cl.
    H04W 4/00         (2006.01)
(52) U.S. Cl. ..................... 370/328; 370/338; 370/310.2
(58) Field of Classification Search .............. 455/404.2, 455/407, 408, 414.2, 422.1–460, 424, 425, 455/440, 456.1–456.6, 457; 370/310.2, 328, 370/329, 338, 434; 379/333, 334
See application file for complete search history.

(56) References Cited

FOREIGN PATENT DOCUMENTS

| JP | 11-275157 | 10/1999 |
|---|---|---|
| JP | 2002-165255 | 6/2002 |
| JP | 2003-520524 | 7/2003 |
| WO | 00/44187 | 7/2000 |

OTHER PUBLICATIONS

Keihi Tachikawa et al., "W-CDMA mobile-communications method", Maruzen, pp. 1-5, Jun. 25, 2001.
3rd Generation Partnership Project (3GPP) Technical Specification (TS), Chapter 7 Protocol states, 25.331.

*Primary Examiner*—Lester Kincaid
*Assistant Examiner*—Sayed T Zewari
(74) *Attorney, Agent, or Firm*—Oblon, Spivak, McClelland, Maier & Neustadt, L.L.P.

(57) ABSTRACT

A mobile-communications system is disclosed. The system includes a mobile station, a wireless-base station enabled to communicate with the mobile station, and a location-information management apparatus for managing a state of the mobile station in a network layer upper to a link layer for managing wireless-communications resources.

The mobile station is provided with wireless-communications means for transmitting and receiving a signal with the wireless-base station in an active state in the link layer for managing the wireless-communications resources, discontinuous-receiving means for discontinuously receiving a control signal from the wireless-base station in the link layer in a state different from the active state, and state-management means for creating a state-transition signal in response to a paging signal included in the control signal.

7 Claims, 29 Drawing Sheets

MOBILE COMMUNICATION SYSTEM, LINE CONCENTRATOR, RADIO BASE STATION, MOBILE STATION, AND COMMUNICATION METHOD

BACKGROUND OF THE INVENTION

1. Field of the Invention

The present invention generally relates to a mobile-communications system, and a line concentrator, a wireless-base station, a mobile station and a communications method for use in the mobile-communications system.

2. Description of the Related Art

In current mobile-communications systems represented by the Third-Generation Mobile-Communications Systems, such method as, for example, WCDMA (Wideband Code Division Multiple Access) is being adopted, which method, from a point of view of efficiently using wireless-communications resources, changes the operational state of a mobile station depending on a period in which a packet is neither transmitted nor received. More specifically, the operational states consist of: a first state for using a dedicated channel to communicate (Cell-DCH); a second state such that a dedicated channel cannot be used but a common channel can be used (Cell-FACH); a third state for discontinuously receiving a control signal from a wireless-base station (Cell-PCH); and a fourth state such that no communications are conducted with the wireless-base station (Idle). These states are managed in a link layer (L2). In a wireless-access network in which the states of the mobile station are managed (UTRAN), which cell the mobile station in each of the first through third operational states belong to (which wireless-base station the mobile station is controlled by) is kept track of. When the cell to which the mobile station belongs changes (when the mobile station is handed over), a cell being managed at the UTRAN is also updated. It is noted that, for the mobile station in the third state, the UTRAN only keeps track of information of the cell last updated. Non-Patent Document 1, for example, discloses such a mobile-communications system.

On the other hand, in an existing mobile-communications system using an IP-compliant network, the states of the mobile station are managed in a network layer or an IP layer (L3) that is upper to the link layer. The states consist of a first state enabled to establish a wireless link so as to communicate (Active) and a second state such that the wireless link has been released (Dormant). The mobile station in the second state can receive a first signal (Router Advertisement) for broadcasting such information as which location-registration area is formed by multiple cells and a second signal (Paging Notification) for use in paging a mobile station. Configuring such a system makes it possible to always keep track of the location of the mobile station at the system side.

Non-Patent Document 1

Keiji Tachikawa et al., "W-CDMA mobile-communications method", Maruzen, published Jun. 25, 2001

SUMMARY OF THE INVENTION

It is a general object of the present invention to provide a technology for mobile communications that substantially obviates one or more problems caused by the limitations and disadvantages of the related art.

It is a more particular object of the present invention to provide a mobile communications system, and a line concentrator, a wireless-base station, a mobile station, and a communications method for use in the mobile-communications system that make it possible to suitably deliver a packet signal even when the states of the mobile station that are managed in the upper and lower layers do not match.

According to the invention, a mobile-communications system includes a mobile station; a wireless-base station enabled to communicate with the mobile station; and a location-information management apparatus for managing the state of the mobile station in a network layer upper to a link layer for managing wireless-communications resources, wherein the mobile station is provided with wireless-communications means for transmitting and receiving a signal with the wireless-base station in an active state in the link layer for managing the wireless-communications resources, discontinuous-receiving means for discontinuously receiving a control signal from the wireless-base station in a state different from the active state in the link layer, and state-management means for creating a state-transition signal in response to a paging signal included in the control signal, wherein the location-information management apparatus is provided with state-management means for managing whether the state of the mobile station in the network layer is active or idle, and area-management means for managing information regarding a cell to which the mobile station in the active state belongs and information regarding a location-registration area to which the mobile station in the idle state belongs, wherein a period in which the mobile station in the active state is neither transmitting nor receiving is measured in the link layer and in the network layer so that the state of the mobile station is changed to a state different from the active state when the period exceeds a predetermined period, wherein a signal destined for a mobile station in a state different from the active state in at least one of the network layer and the link layer is accumulated in the location-information management apparatus or said wireless-base station, and the signal destined for the mobile station is transmitted after the state of said mobile station is changed to the active state, or discontinuously transmitted to the mobile station with the paging signal of the mobile station created in the wireless-base station, and wherein management of state transition of the mobile station in the network layer and management of state transition of the mobile station in the link layer are performed independently.

The mobile-communications system in an embodiment of the invention makes it possible to suitably deliver a packet signal even when the states of the mobile station that are managed in the upper and lower layers do not match.

Other objects and further features of the present invention will be apparent from the following detailed description when read in conjunction with the accompanying drawings.

DETAILED DESCRIPTION OF THE PREFERRED EMBODIMENTS

In the following, embodiments of the present invention are described with reference to the accompanying drawings.

Figure 1:
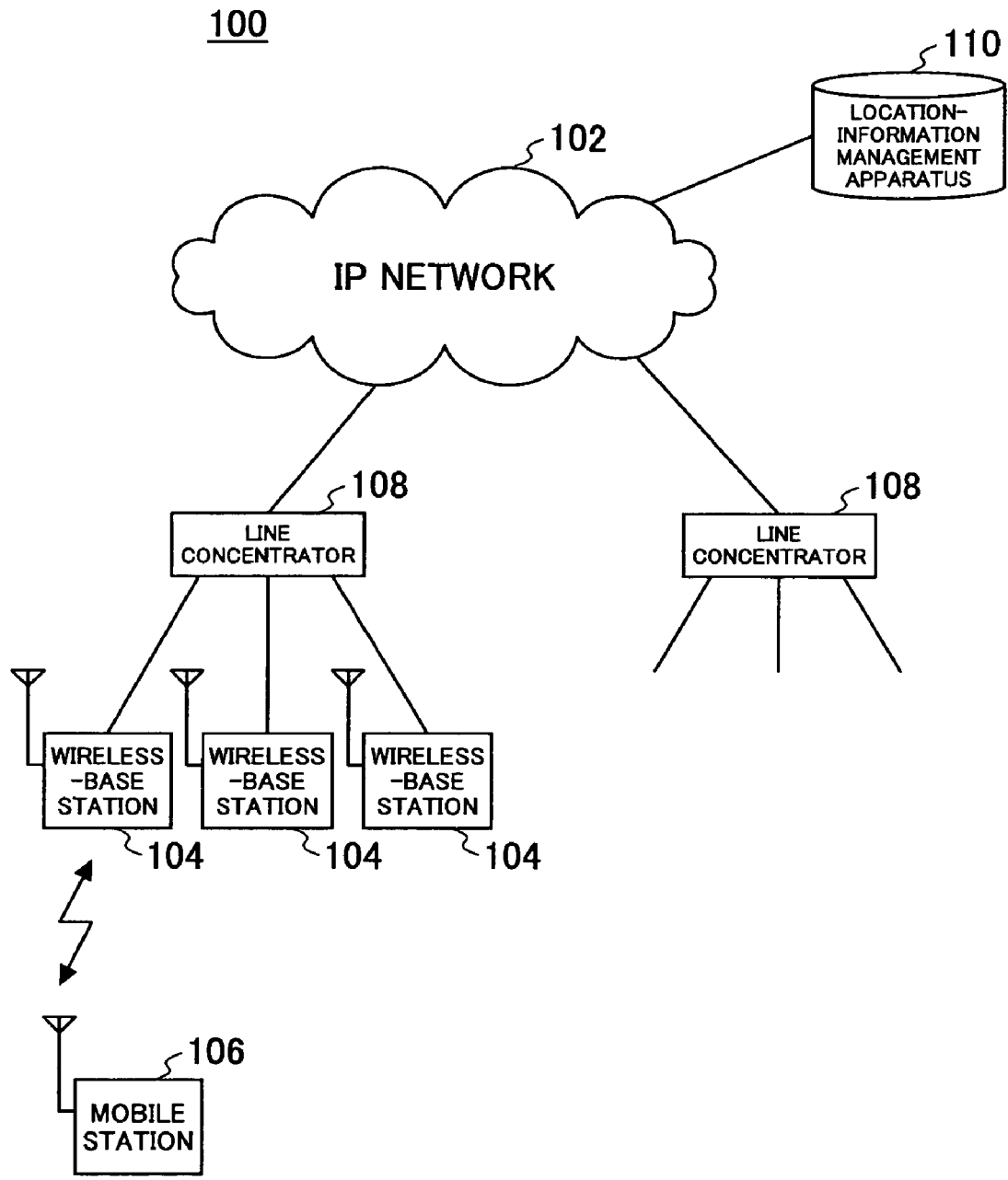
FIG. 1 is a general view of a mobile-communications system in which the present invention can be used.

FIG. 1 is a general view of a mobile-communications system 100 in which the present invention can be used. Generally, in the explanations below, an element which appears first in FIG. 1 is given a reference number which starts with "1", for example. The mobile-communications system 100 has an IP network 102 in which communicating is possible with an Internet Protocol (IP)-compliant communications signal (an IP packet). The mobile-communications system 100 has multiple wireless-base stations 104, each of which is associated with a cell forming a service area. The wireless-base station 104 can communicate with a mobile station 106 belonging to a cell. A predetermined number of wireless-base stations 104 are connected to one line concentrator (hub) 108. The line concentrator 108 is connected to the IP network 102. Moreover, the mobile-communications system 100 has a location-information management apparatus 110 connected to the IP network 102 for managing the state, in a network layer (L3), of the mobile station 106. The state of the mobile station 106 can be managed in the location-information management apparatus 110 by using a home agent for managing the relationship between a home address and a Care-of-Address of the mobile station 106 and a paging agent, etc., for performing paging control of the mobile station 106.

The mobile station 106 is handed over from one cell to another so as to make it possible to move within the service area while wirelessly communicating. The service area is divided into multiple location-registration areas, each of which is formed by a predetermined number of cells, and each location-registration area specifies an area for performing paging of the mobile station 106.

Figure 26:
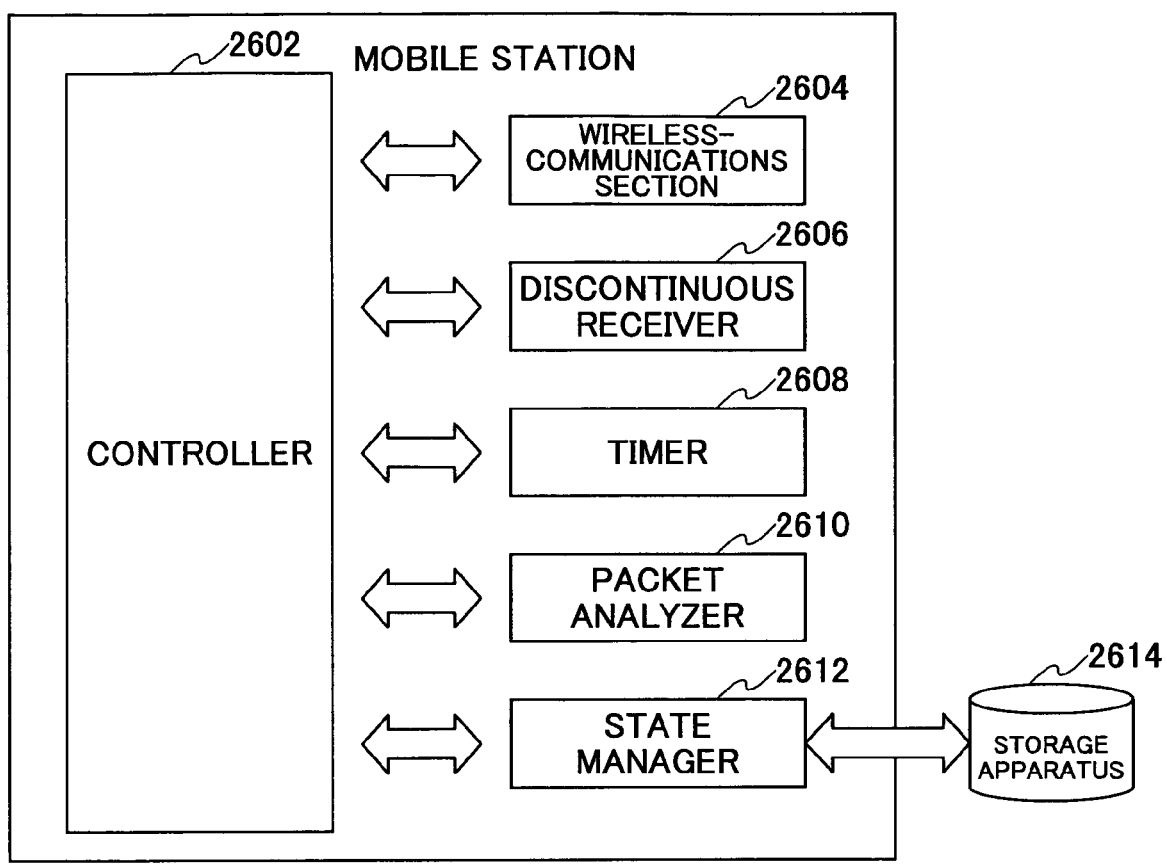
FIG. 26 is a functional block diagram of a mobile station.

FIG. 26 is a functional block diagram for elements especially related to the present embodiments out of a variety of functional elements of the mobile station 106. The mobile station 106 has a controller 2602, a wireless-communications section 2604, a discontinuous receiver 2606, a timer 2608, a packet analyzer 2610, and a state manager 2612. The controller 2602 is for controlling the operations of the variety of the functional elements within the mobile station 106. The wireless-communications section 2604 is a functional section for performing processes (for example, encoding and decoding, modulating and demodulating, etc.) for conducting wireless communications between the wireless-base station and the mobile station. The discontinuous receiver 2606 is a functional section for receiving, in the below-described idle state and battery-saving state, a control packet discontinuously transmitted from the wireless-base station at timings in line with the transmission intervals. The timer 2608 is a functional section for measuring timings for determining whether a transition of the operational state is required (for example, whether a predetermined period has elapsed). The packet analyzer 2610 is a functional section for determining the contents of a header or a payload of a packet received from a wireless-base station. The state manager 2612 is a functional section for managing what the operational state of the mobile station is (an active state, an idle state, or a battery-saving state). Information necessary for state management is stored in a storage apparatus 2614.

Figure 27:
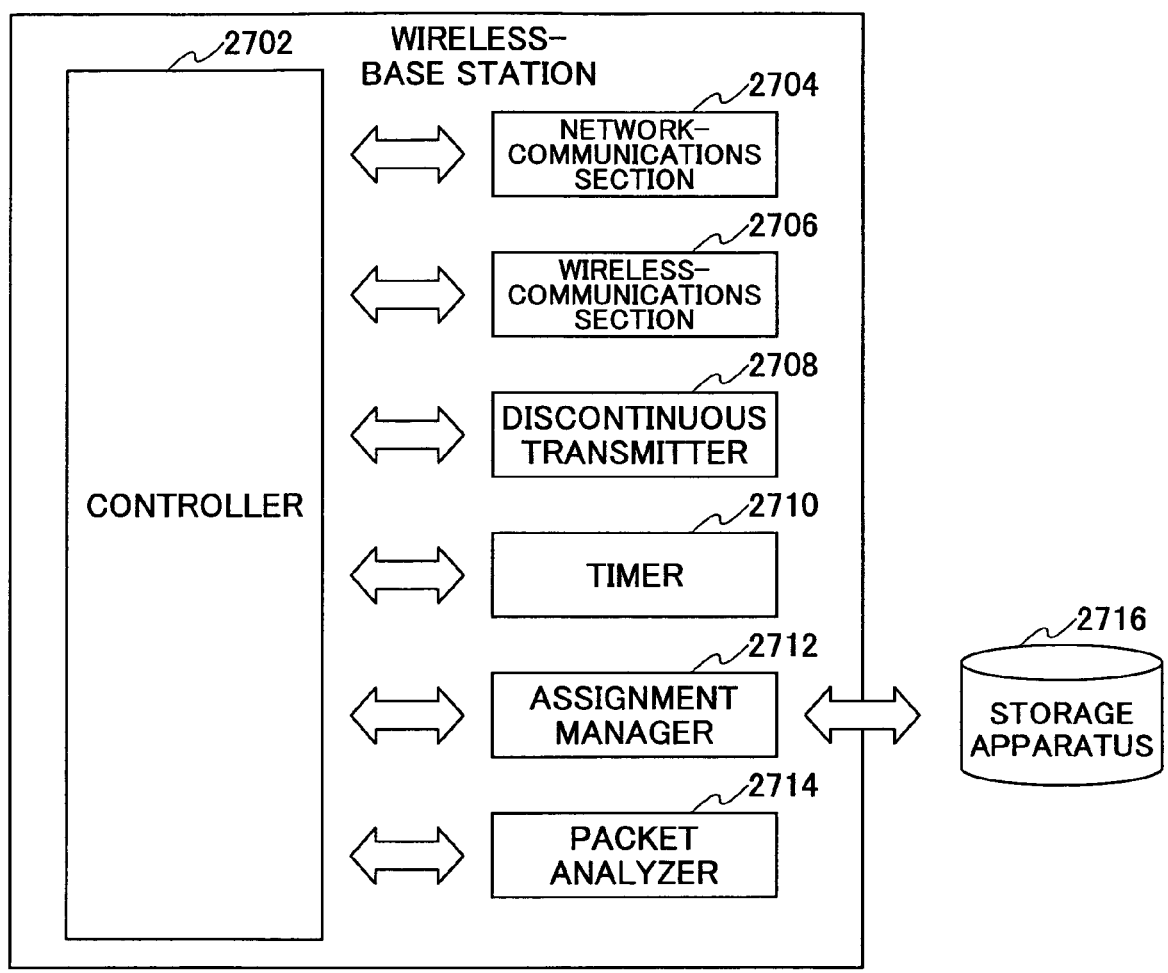
FIG. 27 is a functional block diagram of a wireless-base station.

FIG. 27 is a functional block diagram regarding elements especially related to the present embodiments out of a variety of functional elements of a wireless-base station 104. The wireless-base station 104 has a controller 2702, a network-communications section 2704, a wireless-communications section 2706, an assignment manager 2712, a packet analyzer 2714, and a storage apparatus 2716. The controller 2702 is for controlling the operations of a variety of functional elements within the wireless-base station 104. The network-communications section 2704 is a functional section for performing processes necessary for communicating with a network such as the IP network 102 (and with a node connected to the network). The wireless-communications section 2706 is a functional section for performing processes (for example, encoding and decoding, modulating and demodulating, etc.) for conducting wireless communications between the wireless-base station and the mobile station. The discontinuous transmitter 2708 is a functional section for performing processes for discontinuously transmitting a control packet to an idle mobile station not being managed in the assignment manager 2712 and a battery-saving mobile station being managed therein. The timer 2710 is a functional section for performing timer management in conjunction with the wireless-communications section 2706 and the packet analyzer 2714 depending on the state of assignment of the mobile station being managed in the assignment manager 2712. The timer management includes timing for determining the necessity of transition of the operational state of the mobile station (for example, timing on whether a certain period has elapsed). The assignment manager 2712 manages the operational state and the communications state of the mobile station controlled by the wireless-base station. Information necessary for such management is stored in the storage apparatus 2716. The packet analyzer 2714 is a functional section for determining the contents of the header and the payload of a packet received at the wireless-base station.

Figure 28:
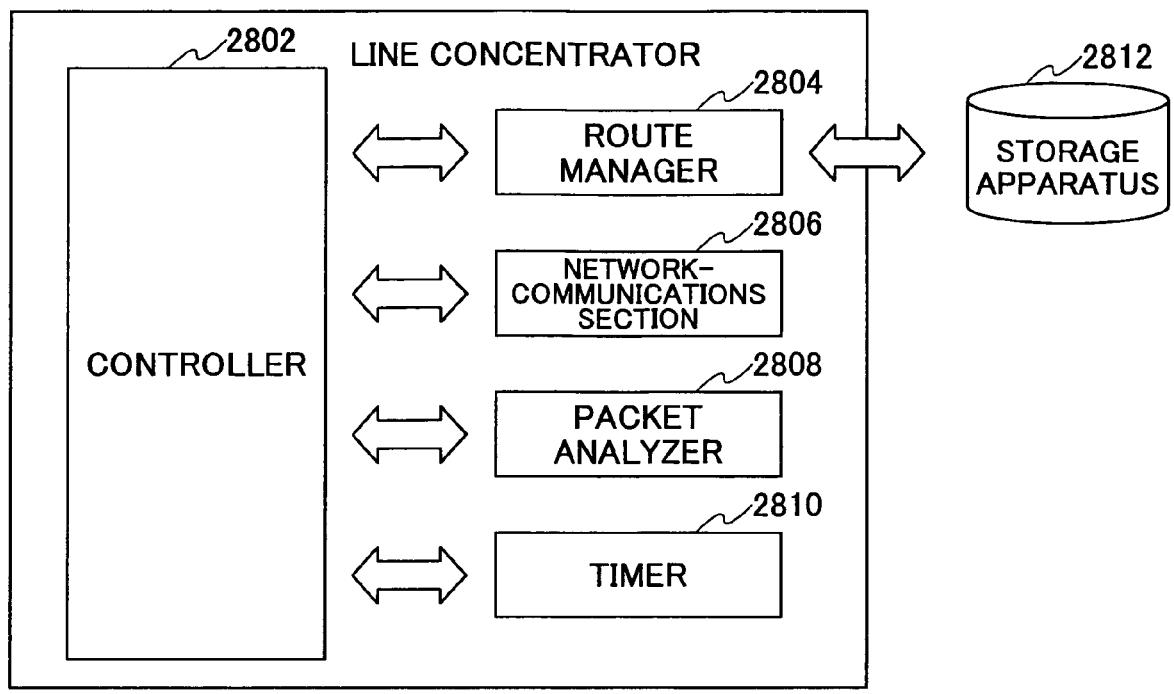
FIG. 28 is a functional block diagram of a concentrator.

FIG. 28 is a functional block diagram of elements especially related to the present embodiments out of a variety of functional elements of a line concentrator 108. The line concentrator 108 has a controller 2802, a route manager 2804, a network communicator 2806, a packet analyzer 2808, and a timer 2810. The controller 2802 is for controlling the operations of a variety of functional elements within the wireless-base station 104. The route manager 2804 is a functional section for updating (deleting, changing, adding, etc.) information regarding a route to the mobile station (a packet-delivery route). Route information is stored in a storage apparatus 2812. The network manager 2806 is a functional section for performing processes necessary for communicating with a network such as the IP network 102 (and a node connected to the network). The packet analyzer 2808 is a functional section for determining the contents of the header and the payload of a packet received via the network. The timer 2810 times and determines whether a predetermined period has elapsed after transferring a packet from the line concentrator to the mobile station. As described below, it is possible to provide for deleting route information regarding the mobile station after a predetermined period has elapsed.

It is noted that the line concentrator 108, from a point of view of speedily deleting by itself unnecessary route information, is desirably provided with the timer 2810. However, the timer 2810 is not mandatory so that it can be omitted. When omitting, deleting the route information is performed only with a request from the wireless-base station 106 or the mobile station 104.

Figure 29:
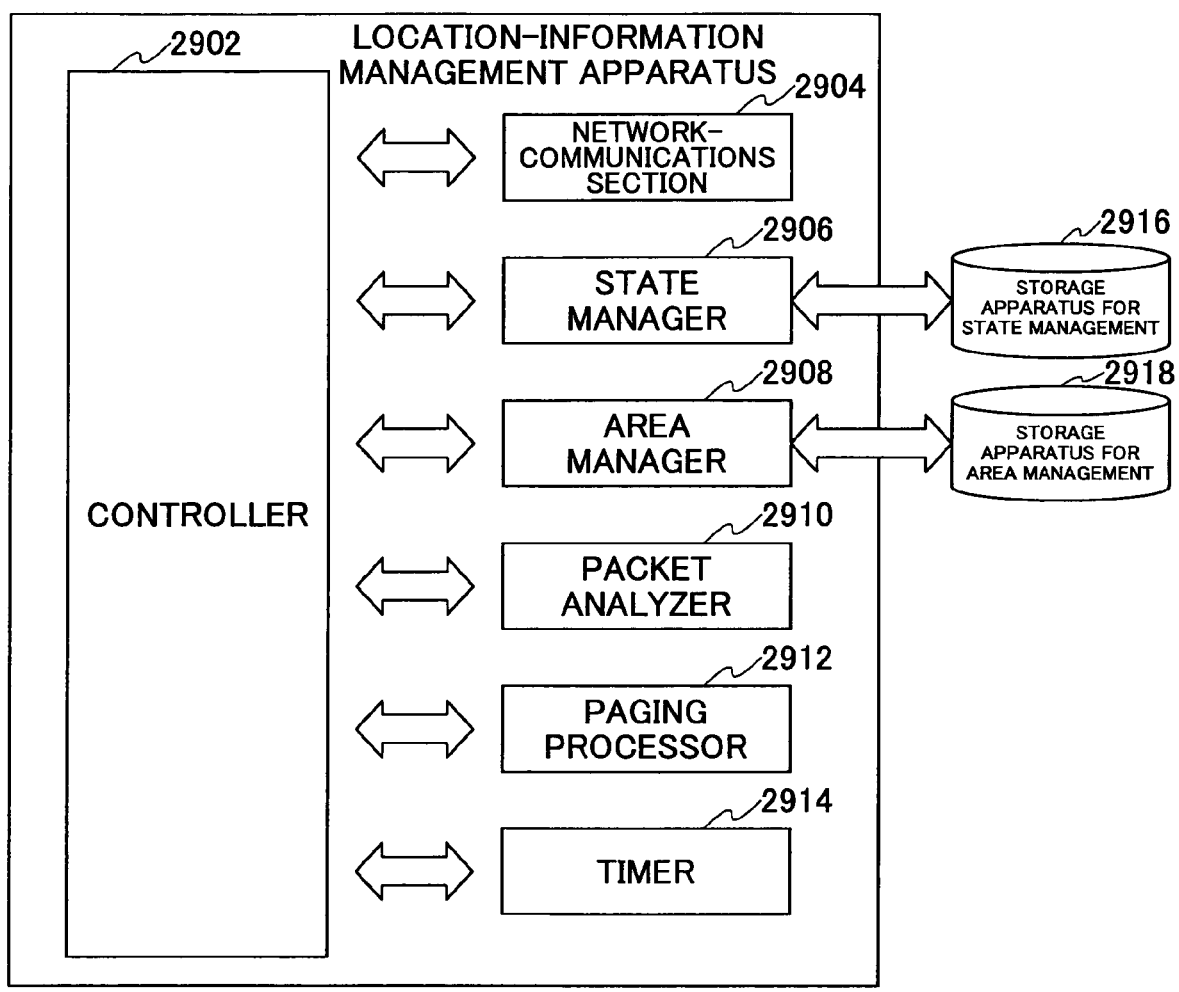
FIG. 29 is a functional block diagram of a location-information management apparatus.

FIG. 29 is a functional block diagram for elements especially related to the present embodiments out of a variety of functional elements within a location-information management apparatus. A location-information management apparatus 110 has a controller 2902, a network-communications section 2904, a state manager 2906, an area manager 2908, a packet analyzer 2910, a paging processor 2912, and a timer 2914. The controller 2902 is for controlling the operation of a variety of functional elements within the location-information management apparatus 110. The network-communications section 2904 is a functional section for performing processes for conducting communications with other nodes connected to a network such as the IP network 102. The state manager 2906 is a functional section for managing the states (active, idle) of the mobile station in the network layer. Information necessary for the state management is stored in a storage apparatus for state management 2916. The area manager 2908 is a functional section for managing an area for registering (a location-registration area) when the state being managed in the state manager is the idle state. Information necessary for area management is stored in a storage apparatus for area management 2918. The packet analyzer 2910 is a functional section for extracting, from a packet received from the network-communications section 2904, and analyzing the payload. The paging processor 2912 is a functional section for transmitting in conjunction with the area manager 2908 a paging packet to all the location-registration areas when a packet destined for a mobile station being managed as idle in the state manager 2906 is received by the location-information management apparatus 110. The timer 2914 is a functional section for timing a period for which no packet transmissions/receptions are conducted at an active mobile station and for reporting the fact to the state manager 2906 when the period has exceeded a predetermined period.

Figure 2:
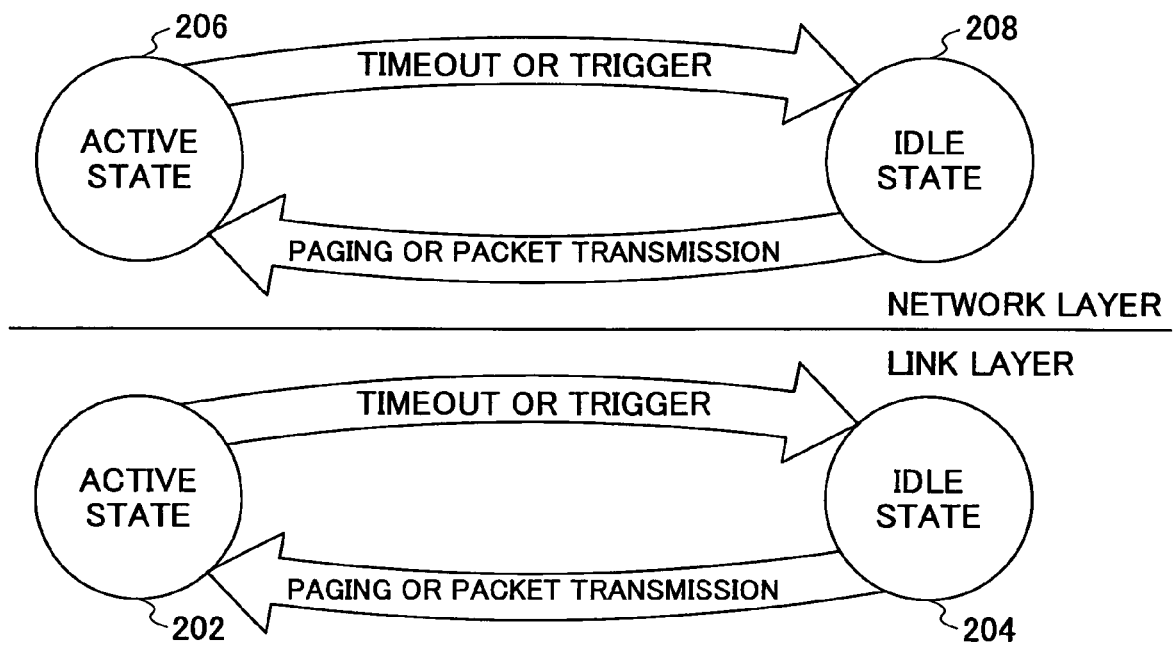
FIG. 2 is a state-transition diagram of a mobile station according to the present embodiments.

FIG. 2 is a state-transition diagram of a mobile station according to the present embodiments. The operations of a mobile station are managed using two states (an active state and an idle state) in both a link layer (L2) and a network layer (L3). In an active state 202 in the link layer, the mobile station can communicate via a wireless link established with a wireless-base station. In this case, the wireless-base station keeps track of which mobile station has a wireless link established out of the mobile stations controlled by the wireless-base station. In an idle state 204, the wireless link is released and the mobile station discontinuously receives a control signal transmitted from the wireless-base station. In other words, while the mobile station in the active state can transmit/receive a signal with the wireless-base station, the mobile station in the idle state only receives a signal from the wireless-base station.

In an active state 206 in the network layer, the location-information management apparatus 110 keeps track of which cell the mobile station 106 belongs to. In an idle state 208, the location-information management apparatus 110 keeps track of which location-registration area the mobile station 106 belongs to. State transitions from the active states 202, 206 to the idle states 204, 208 can be performed when, for example, a packet signal is not received in an active state for a predetermined period. The state transition may also be performed using a direct control signal (a trigger) requesting state transition. Moreover, the state transitions from the idle states 204, 208 to the active states 202, 206 can be performed for paging a mobile station in order to transfer a packet signal destined for the mobile station and for the mobile station to transmit a packet signal.

An important point to note is that, when transitioning between such states as described above, whether the state transition in the link layer is possible is determined by the wireless-base station 104. For example, the wireless-base station 104 approves the request from the mobile station 106 for establishing a wireless link so that the transition to the active state 202 is performed. In this case, authorizing, etc., by an upper location-information management apparatus 110 is not necessary. Moreover, a further important point to note is that whether the state transition in the network layer is possible is determined by the location-information management apparatus 110. Thus, in the mobile-communications system 100 according to the present embodiments, the state in the link layer (the lower layer) of the mobile station 106 is managed by the wireless-base station 104, while the state in the network layer (the upper layer) of the mobile station 106 is managed by the location-information management apparatus 110.

A FIRST EMBODIMENT

Figure 3:
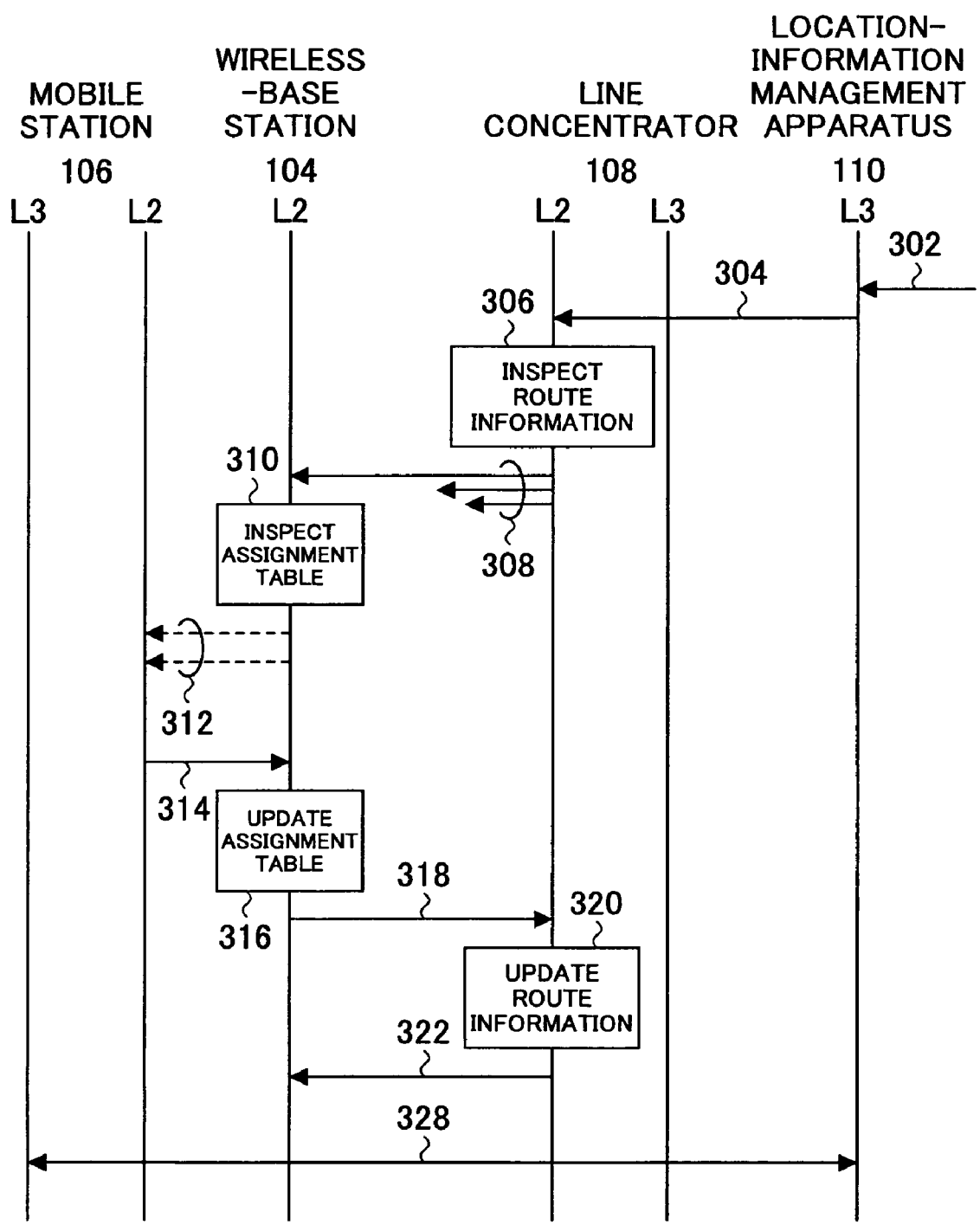
FIG. 3 is a flowchart showing operations in a mobile-communications system according to the present first embodiment.

FIG. 3 is a flowchart showing schematic operations in a mobile-communications system 100 according to the present first embodiment. In the flowchart of FIG. 3, it is assumed that a link layer (a lower layer L2) of a mobile station is managed such that it is in an idle state, while a network layer (an upper layer L3) of the mobile station is managed such that it is in an active state. It is ideal that the states in the link layer and network layer are both idle or both active. However, as the states in each of the layers may be managed independently, a situation in which one of the states is idle and the other active may occur at least temporarily.

In steps 302, 304 it is assumed that a packet signal destined for the mobile station 106 arrives at the location-information management apparatus 110. As the mobile station 106 (or the state in the network layer of the mobile station 106) is being managed in the active state in the location-information management apparatus 110, the location-information management apparatus 110 tries to transfer the packet signal to a cell (a wireless-base station) to which the mobile station 106 belongs.

In step 306 the line concentrator 108 which has received the packet signal checks whether route information regarding the mobile station 106 exists. When a wireless link to the mobile station 106 is established (when it is active in the link layer), meaningful route information exists. However, in the present case, such route information does not exist as the link layer is idle.

In step 308 when meaningful route-information does not exist, a packet signal is transmitted by multicast to all wireless base stations connected to the line concentrator 108.

In step 310 the wireless-base station 104 which has received a packet signal checks whether there exists in an assignment table the mobile station 106 for which the packet signal is destined. The assignment table is a list for managing a mobile station which has a wireless link established with a wireless-base station. In the present case, a wireless link is not established with the destination mobile station 106 so that the destination mobile station 106 discontinuously receives a control signal. Therefore, the wireless-base station 104 confirms that the destination mobile station 106 is not listed in its own assignment table. Then, the packet signal is buffered so as to be held.

In step 312 the wireless-base station 104 creates a paging packet signal for paging the destination mobile station 106 and includes the paging packet signal in a control signal discontinuously transmitted.

In step 314 the destination mobile station 106 that received the paging packet signal transmits to the wireless-base station 104 a state-transition report indicating that a wireless link should be established so as to transition from the idle state to the active state. The mobile station 104 performs a state transition based on the response from the wireless-base station 104.

In step 316 the wireless-base station 104 that received the state-transition report establishes a wireless link and updates the assignment table by adding the mobile station 106 to the assignment table.

In step 318 the wireless base-station 104 requests the line concentrator 108 to add a transfer route of a signal destined for the mobile station 106.

In step 320 the line concentrator 104 updates the route information by adding the transfer route in response to the request. The contents of communication of the route information may be, for example, deleting route information for a certain mobile station, adding route information for a newly-connected mobile station, changing route information for a certain mobile station, etc.

In step 322 the line concentrator 108 reports to the wireless-base station 104 that the transfer route is set up.

In step 328 the mobile station 106 thereafter receives the buffered packet signal and communicates with the originator of the signal in the active operational state in both the upper and lower layers.

Figure 4:
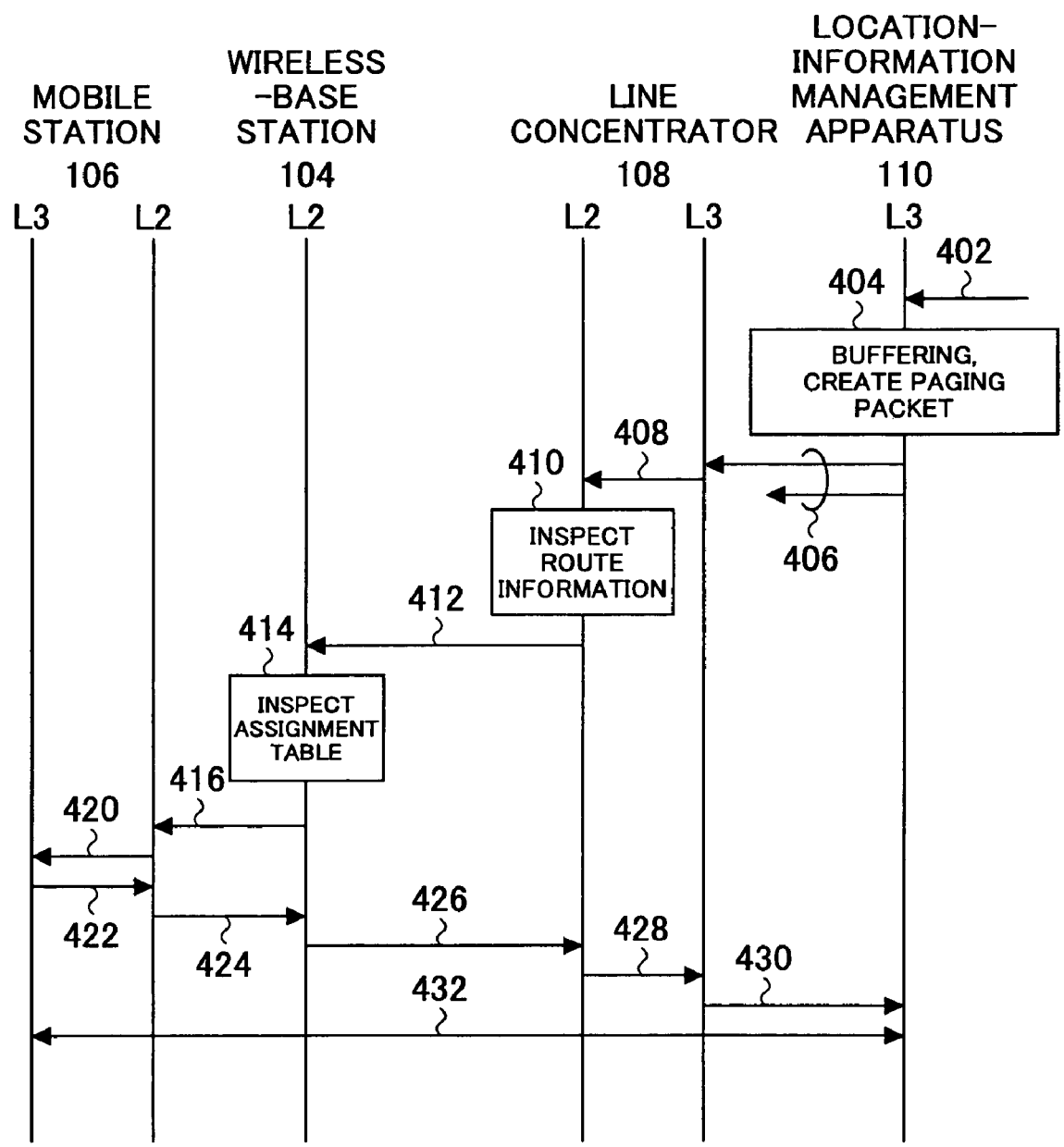
FIG. 4 is another flowchart showing the operations in the mobile-communications system according to the present first embodiment.

In a flowchart shown in FIG. 4, on the other hand, a link layer (a lower layer L2) of a mobile station is managed as being active while a network layer (an upper layer L3) is managed as being idle. In step 402 a packet signal destined for the mobile station 106 arrives at the location-information management apparatus 110. As the destination mobile station 106 is managed as being idle, the location-information management apparatus 110 only keeps track of a location-registration area of the mobile station 106.

In step 404 the packet signal is buffered and a paging packet signal for paging the destination mobile station 106 is created. The important point to note is that the paging packet signal in this case is one in the network layer.

In steps 406 and 408 the paging packet signal is transmitted to all line concentrators 108 or wireless-base stations 104 that are included in the location-registration area for the mobile station 106. In the present embodiment, the location-registration area consists of a large number of cells associated with multiple wireless-base stations connected to multiple line concentrators.

In step 410 the line concentrator 108 that receives the paging packet signal checks whether there is a transfer route for the destination mobile station 106. In the case of the current example, the lower layer is active so that such a transfer route exists.

In step 412, according to the transfer route, the paging packet signal is transferred to the wireless-base station 104.

In step 414, in the wireless-base station 104, an assignment table is inspected. In the case of the current example, a wireless link is set up to the destination mobile station 106.

In step 416 the wireless-base station 104 uses the wireless link to transmit to the mobile station 106 the paging packet signal in the signal format in the link layer. The mobile station 106 first receives the paging packet signal in the signal format in the link layer. Then the mobile station 106 extracts the paging packet signal in the network layer.

In step 420 the mobile station 106 becomes aware that the mobile station itself is being paged and that the state in the network layer should be active. Then, the mobile station 106 creates a state-transition report indicating that such state transition should be performed. The destination of the state-transition report is the location-information management apparatus 110. Such state-transition reporting as described above is performed in order to query the location-information management information 110 as to whether it is possible to change the idle state in the network layer of the mobile station 106 to the active state.

In steps 422 and 424 the state-transition report is transmitted in the signal format of the link layer to the wireless-base station 104.

In steps 426, 428, and 430 the state-transition report is transmitted to the line concentrator 108 and is delivered via the IP network 102 to the location-information management apparatus 110. In the location-information management apparatus 110, the state transition of the mobile station is approved, and the state of the mobile station 106 in the network layer is changed from the idle state to the active state and the fact that the state is changed is reported to the mobile station 106.

In step 432 the location-information management apparatus 110 transfers to the mobile station 106 the packet signal being buffered so that subsequent communications between the mobile station 106 and the originator can be performed.

Figure 5:
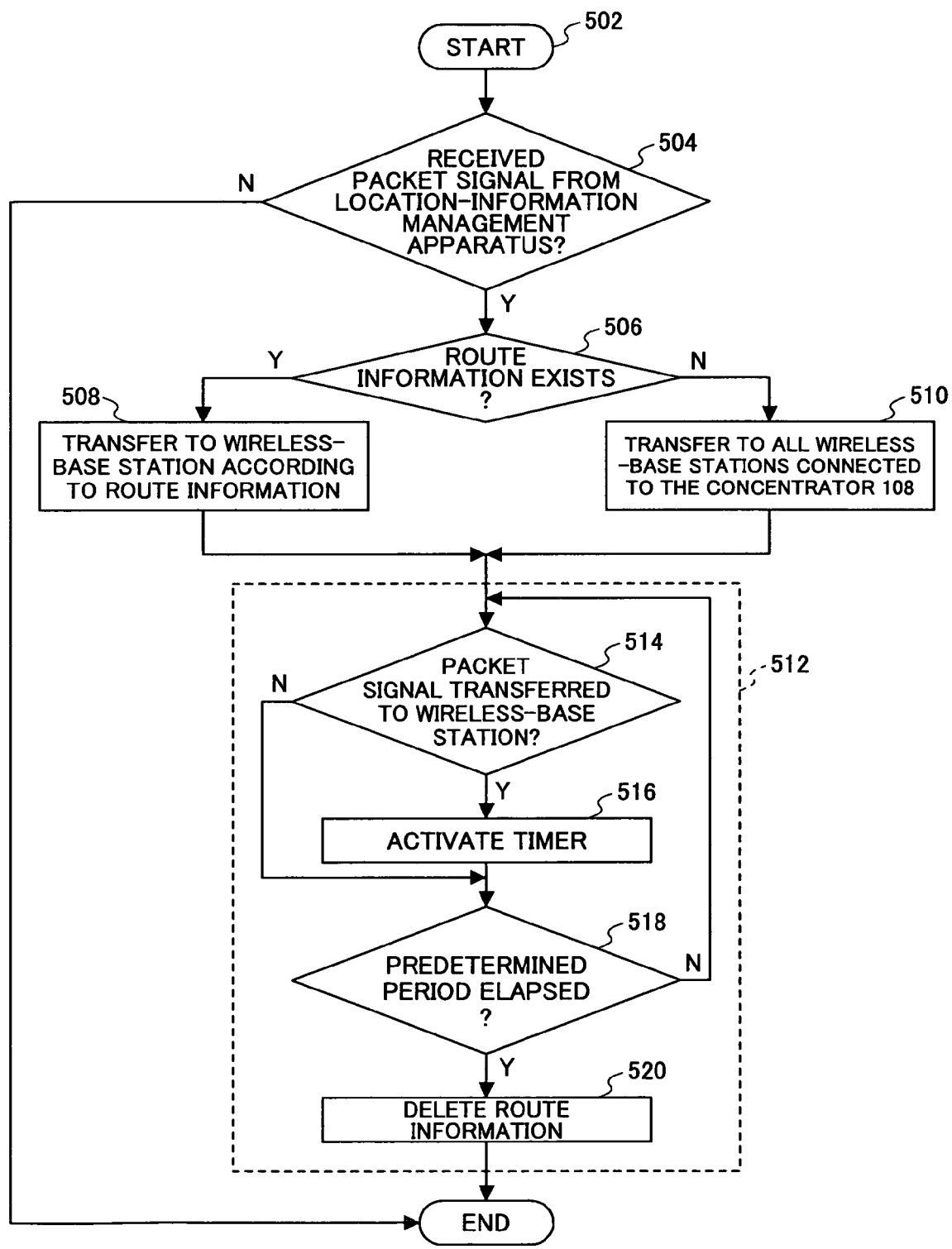
FIG. 5 is a flowchart showing operations of a line concentrator in the mobile-communications system according to the present first embodiment.

FIG. 5 is a flowchart concerning, out of operations of a line concentrator 108, those on transmission of a packet signal that is from a location-information management apparatus 110 to a wireless-base station 104 controlled by the line concentrator 108. The flow starts at step 502 and in step 504 the process determines whether the line concentrator 108 has received from the location-information management apparatus 110 a packet signal to be transferred to the wireless-base station 104 controlled by the line concentrator 108. When the packet is not received, the flow is immediately terminated.

In step 506, when the packet is received, whether there is route-information regarding the destination of the packet signal is determined.

In step 508, when there is desired route information, the packet signal is transferred to the wireless-base station 104 indicated by the route information.

In step 510, when there is no desired route information, the packet signal is transmitted by multicast to all wireless-base stations 104 connected to the line concentrator 108. Thus, the line concentrator 108 transmits the packet signal to the wireless-base station 104 controlled by the line concentrator 108.

Next, a process 512 is performed for deleting unnecessary route information.

In step 514, whether the packet signal is transferred to the wireless-base station is determined.

In step 516, when the packet signal is transferred, the timer is activated.

In step 518, whether a predetermined period has elapsed is determined. When the predetermined period has elapsed, in step 520, the route information is updated by deleting the route information.

On the other hand, in step 518, when the predetermined period has not elapsed, the process returns to step 514 so that whether the packet signal has been transferred to the wireless-base station 104 is again determined. When the packet signal is newly transferred, the process proceeds to step 516 so that the timer is activated again. When the packet has not been transferred in step 514, the process proceeds to step 518 so that whether a predetermined time has elapsed is determined.

Thus, when a packet signal is transferred from the line concentrator 108 to the wireless-base station 104, a timer is activated and, when a predetermined period has elapsed without any packet signals being newly transmitted, the route information for the wireless-base station is deleted.

Figure 6:
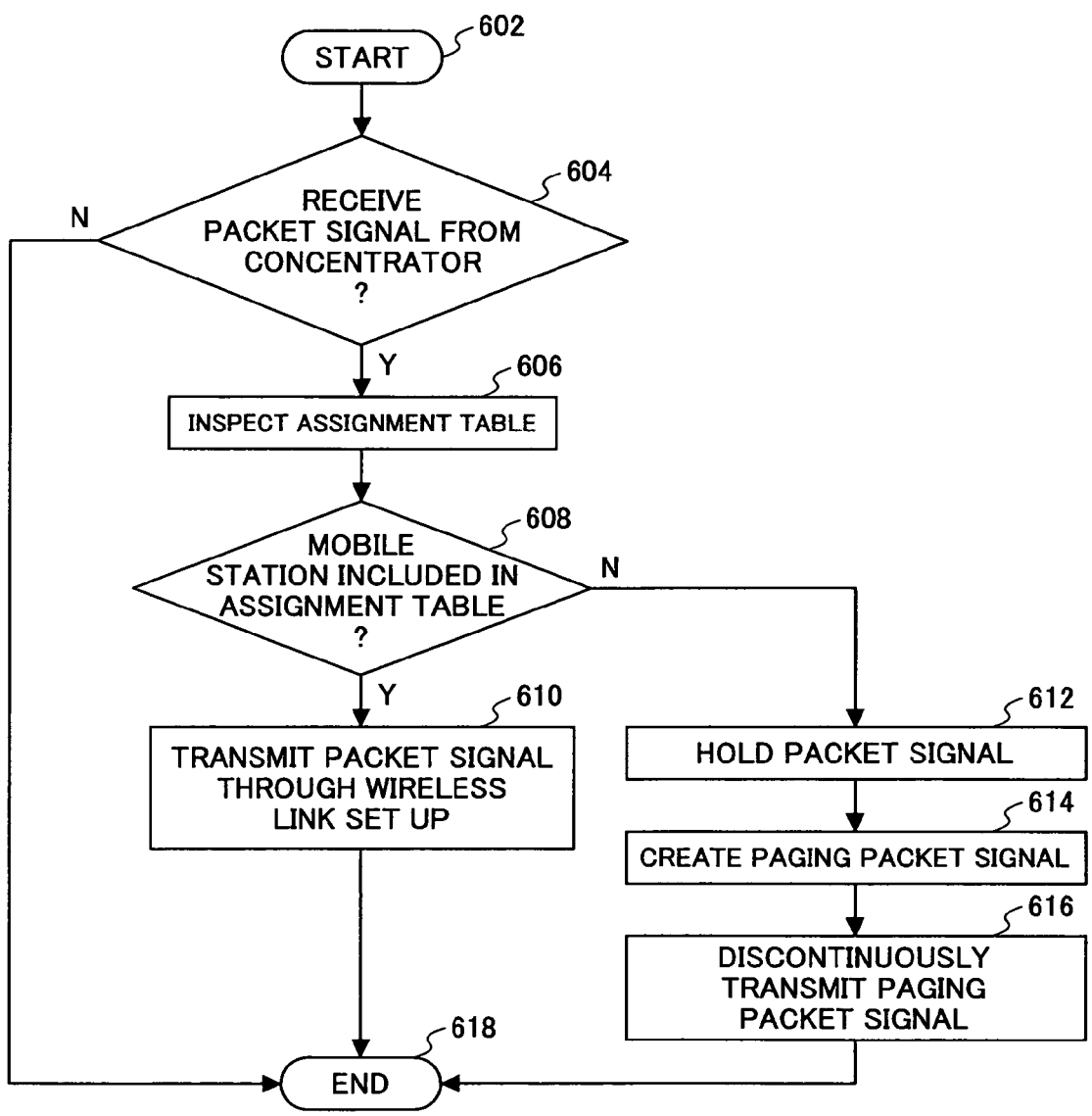
FIG. 6 is a flowchart showing operations of a wireless-base station in the mobile-communications system according to the present first embodiment.

FIG. 6 is a flowchart showing, out of operations performed in a wireless-base station 104, operations in a case such that a packet signal is received from the line concentrator 108. This flow starts from step 602 so that in step 604 it is determined whether the packet signal is received. When the packet signal is not received, the flow ends immediately.

In steps 606 and 608, when the packet signal is received, it is determined whether the destination mobile station 106 of the packet signal is included in the assignment table listing all mobile stations which have a wireless link established with the wireless-base station 104.

In step 610, when the destination mobile station 106 is included, the packet signal received from the line concentrator 108 is transmitted to the mobile station 106 via the wireless link set up and proceeds to step 618 so that the flow terminates.

In step 612, when it becomes evident that the destination mobile station 106 is not included in the assignment table, the packet signal received from the line concentrator 108 is buffered so as to be held. In this case, the destination mobile station 106 is in the idle state of discontinuously receiving a control signal under the control of the wireless-base station 104 or under the control of a different wireless-base station.

In steps 614 and 615, the wireless-base station 104 creates a paging packet signal for paging the destination mobile station 106, and transmits the paging packet signal to the idle mobile station 106 controlled by the wireless-base station 104 using a control signal discontinuously transmitted.

Figure 7:
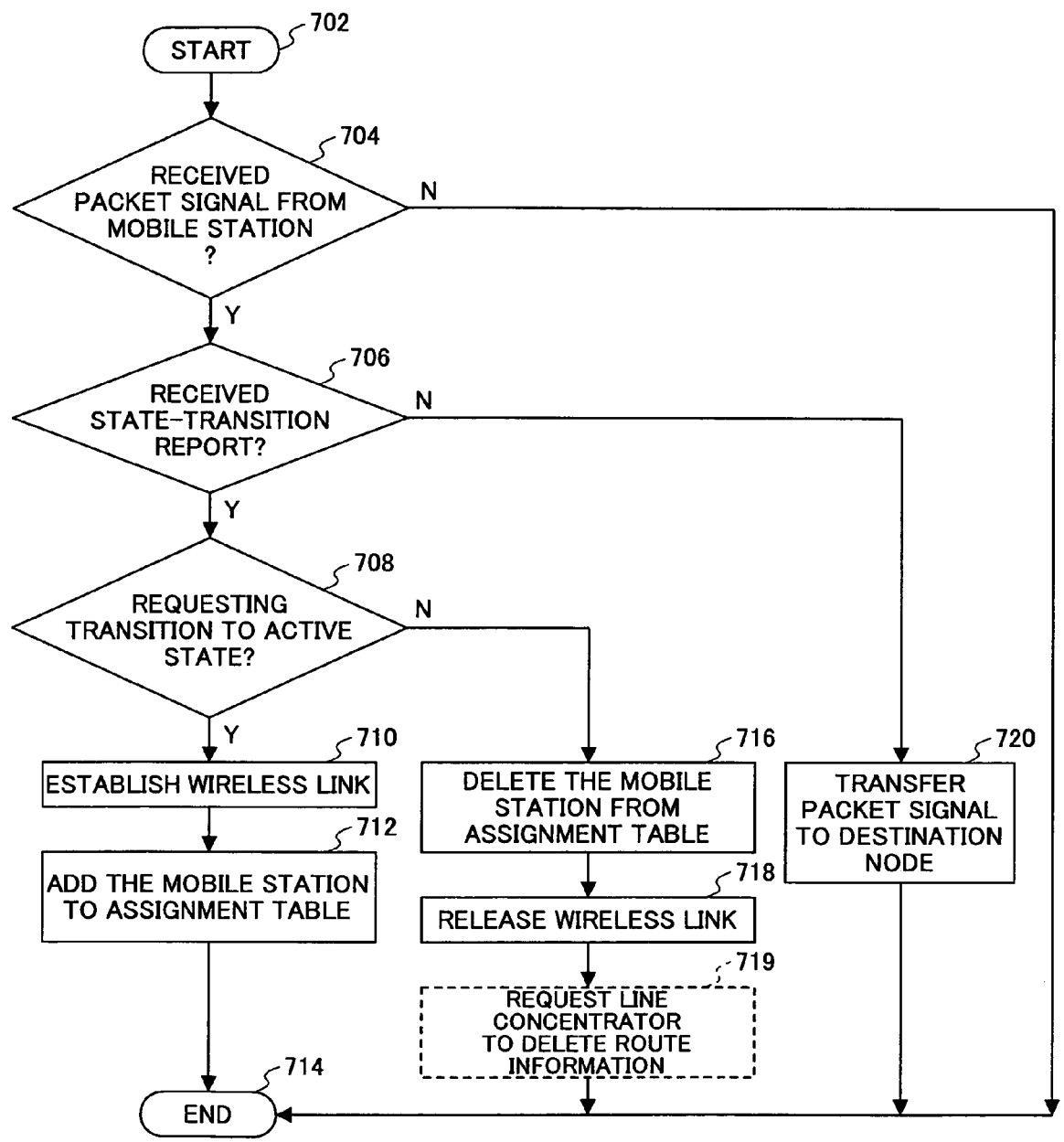
FIG. 7 is another flowchart showing the operations of the wireless-base station in the mobile-communications system according to the present first embodiment.

FIG. 7 is a flowchart showing, out of operations performed in the wireless-base station 104, those in a case such that a packet signal is received from the mobile station 106. This flow starts from step 702 so that in step 704 whether the packet signal is received from the mobile station 106 is determined. When the packet is received, the process proceeds to step 706.

In step 706, whether a state-transition report is included in the received packet signal is determined. When the report is included, the process proceeds to step 708.

In step 708, whether the state-transition report is one requesting a state transition from an idle state to an active state is determined. When the report is one requesting the state transition to the active state, the process proceeds to step 710.

In step 710, a wireless link is established for the requesting mobile station 106.

In step 712, the mobile station 106 is added to an assignment table so that the flow is terminated in step 714.

On the other hand, if the state-transition report as described above is not requesting the state transition to the active state in step 708, the state-transition report is one requesting a state transition from the active state to the idle state.

In step 716, in this case, the mobile station 106 is deleted from the assignment table.

In step 718, a wireless link for the mobile station 106 which is deleted from the assignment table is released. It is noted that step 719 is a selective step as described below.

On the other hand, in step 720, when the state-transition report is not received in step 706, the packet signal is transferred to the destination node of the packet signal.

It is noted that the flow is immediately terminated when the packet signal is not received from the mobile station 106 in step 704.

Figure 8:
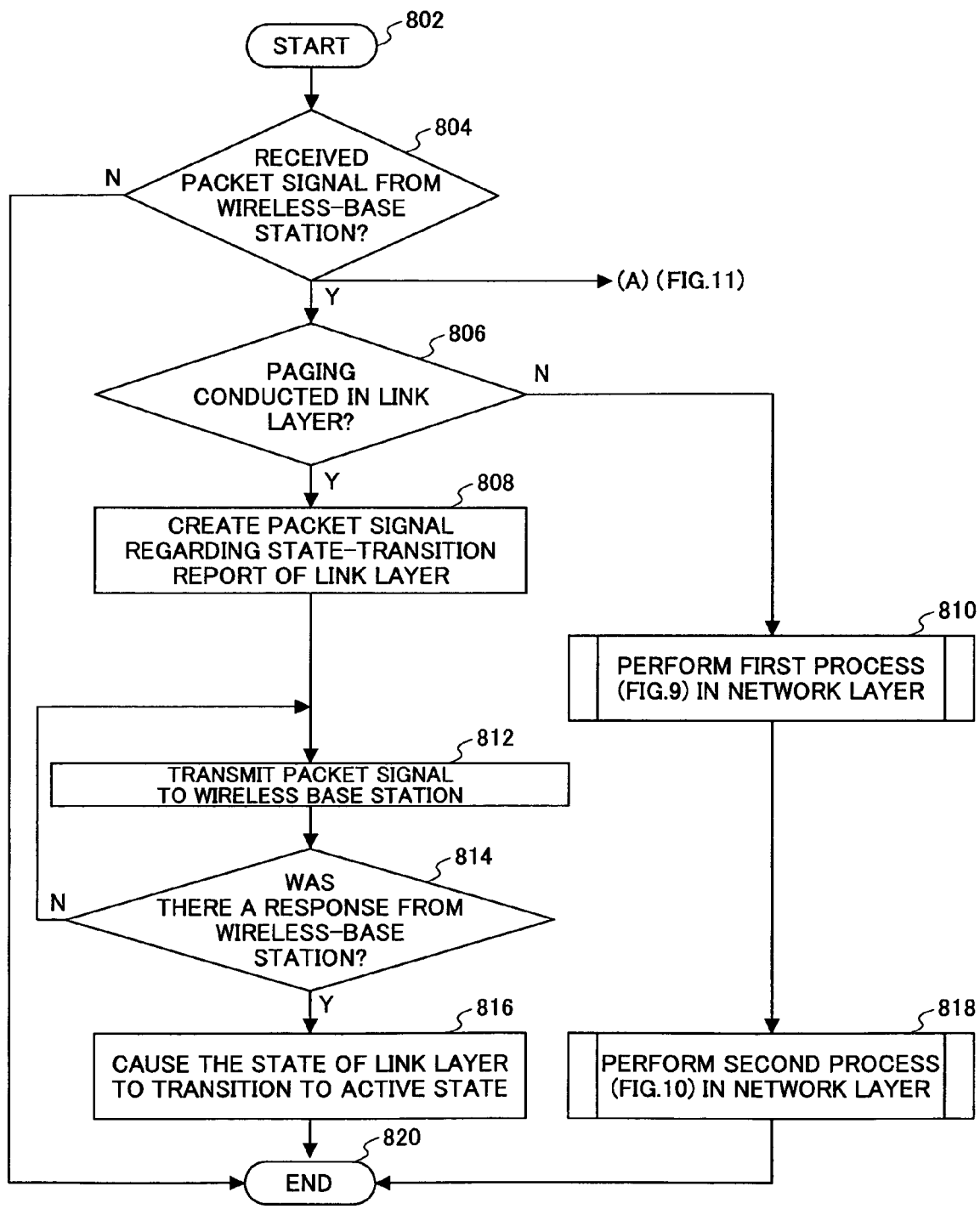
FIG. 8 is a flowchart showing operations of a mobile station in the mobile-communications system according to the present first embodiment.

FIG. 8 shows operations of a mobile station 106 in a mobile-communications system 100. The flow starts from step 802. In step 804, it is determined whether the mobile station 106 receives a packet signal from a wireless-base station 104. When it does not receive the packet signal the flow is immediately terminated, while when it receives the packet signal the process proceeds to step 806.

In step 806, a packet signal from the wireless-base station 104 that is received in a link layer is inspected so that whether paging in the link layer is performed is determined. When the paging is not performed, the process proceeds to step 810 so that a first process is performed on an IP packet signal extracted from the packet signal inspected in step 806. The IP packet signal has the contents to be processed in the network layer.

Figure 9:
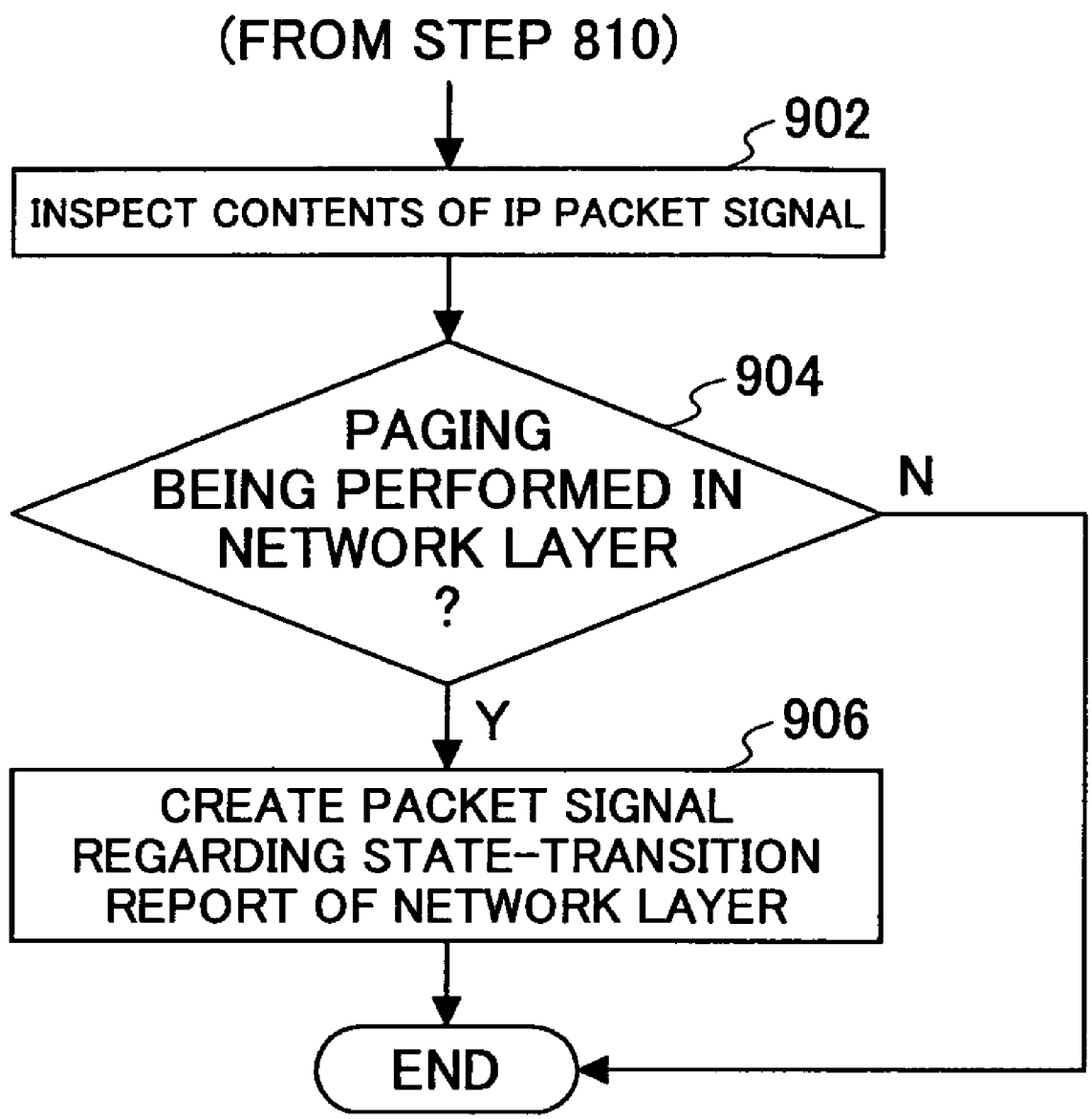
FIG. 9 is a flowchart illustrating details of a first process performed in a network layer.

FIG. 9 is a flowchart illustrating details of a first process performed in a network layer (step 810). First, in step 902, the contents of the IP packet signal transmitted from a link layer to the network layer are inspected.

In step 904, whether paging in the network layer is performed on this IP packet signal is determined. When the paging is not performed, the first process is terminated.

In step 906, when the paging is performed, a packet signal is created concerning a state-transition report indicating to the location-information management apparatus 110 that the state should be changed from the idle state to the active state so that the first process is terminated.

In step 818, a further second process in the network layer is performed.

Figure 10:
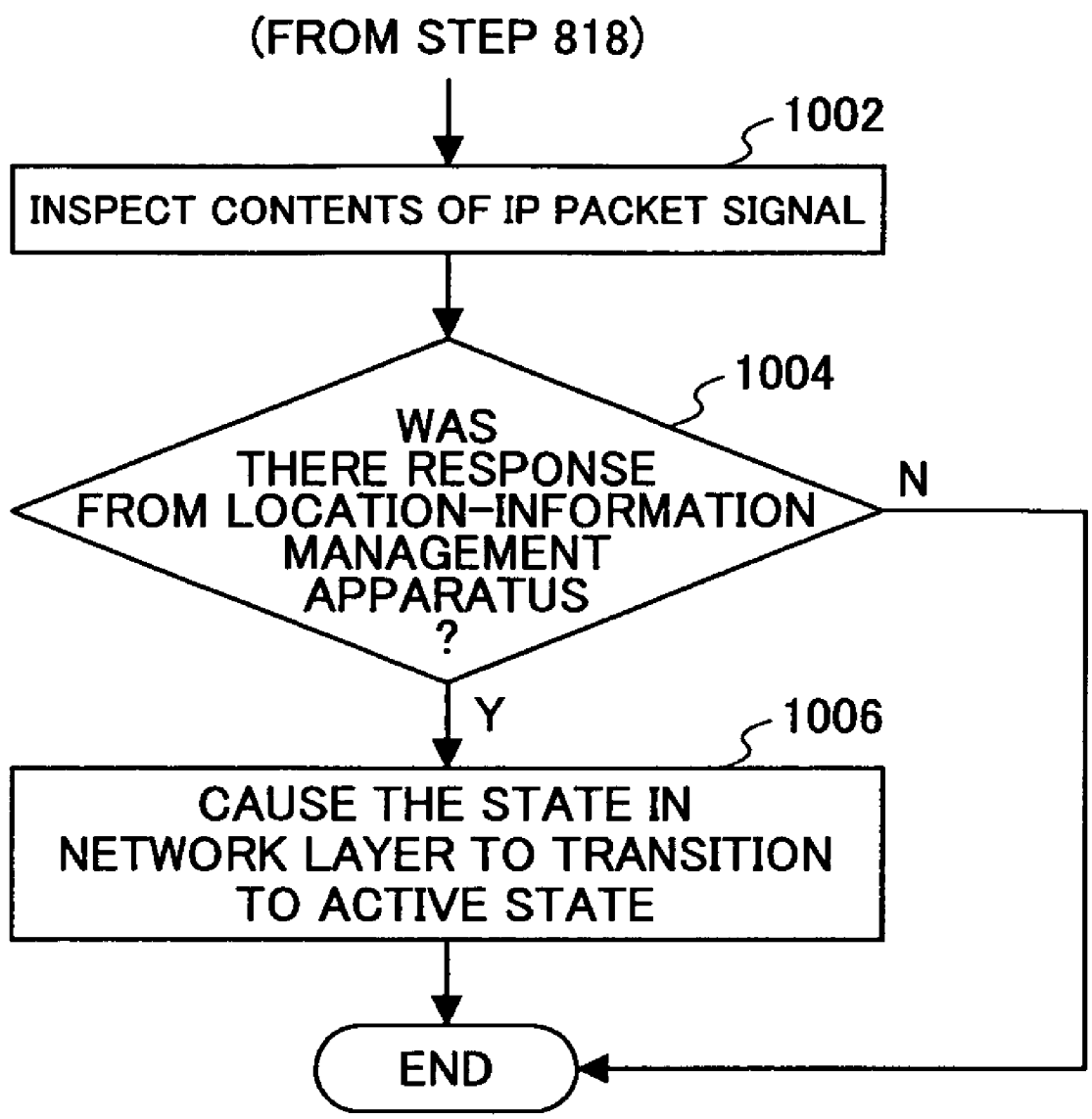
FIG. 10 is a flowchart illustrating details of a second process performed in the network layer.

FIG. 10 is a flowchart illustrating details of a second process performed at the network layer (step 818). In step 1002, the mobile station 106 inspects a packet signal received from the wireless-base station 104 and determines whether there is included a response from the location-information management apparatus 110 for the state-transition report of the network layer.

In step 1004, whether the response exists is determined. When there is no response, a state transition in the network layer is not performed so that the second process is terminated.

In step 1006, when the response exists, the state in the network layer is changed from the idle state to the active state and the process returns to step 818 in FIG. 8 so as to proceed to step 820 so that the flow is terminated.

On the other hand, in the link layer, in step 808, when paging is performed in step 806, a packet signal is created concerning a state-transition report indicating that a state in the link layer should be changed to active.

In step 812, a packet signal is transmitted to the wireless-base station 104. In addition to the fact that the packet signal in this case includes a state-transition report of the link layer that is destined for the wireless-base station 104, when the process of the step 906 is performed, the packet signal also includes the state-transition report of the network layer that is destined for the location-information management apparatus 110.

In step 814, whether there exists a response from the wireless-base station 104 that is for the state-transition report of the link layer is determined. When there is no response, the process returns to step 812.

In step 816, when there is a response from a wireless-base station 104 (ACK), the mobile station 106 is added to the assignment table of the wireless-base station 104, a wireless link is established, and the state in the link layer is changed to active.

Figure 11:
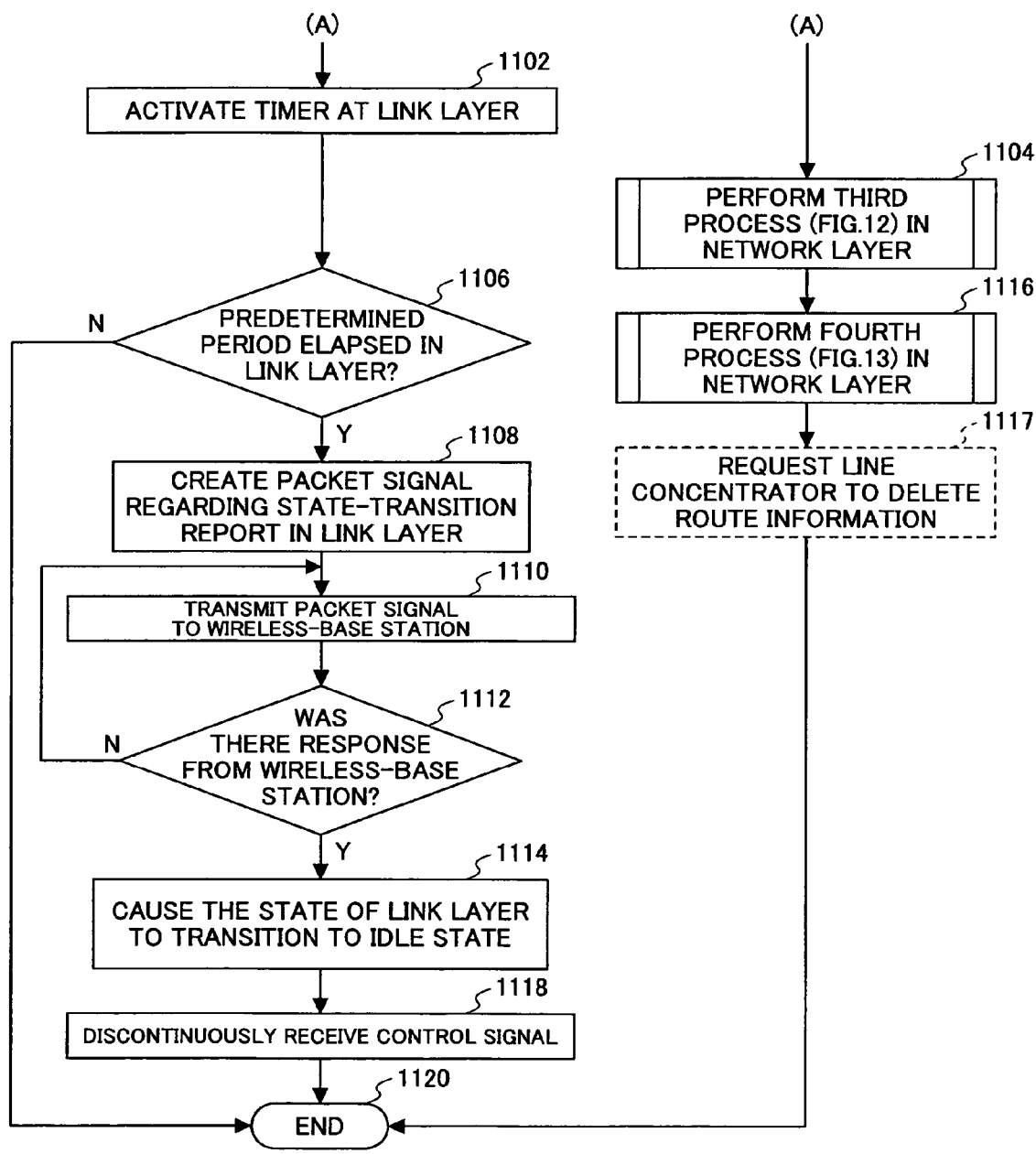
FIG. 11 is another flowchart showing the operations of the mobile station in the mobile-communications system according to the present first embodiment.

FIG. 11 illustrates the operations concerning timer processes in the link layer and the network layer of the mobile station 106 in the mobile-communications system 100. This flow starts from a timing as represented by a letter (A) between step 804 and step 806 in FIG. 8. First, in step 1102 a timer is activated in the link layer and in step 1104 a third process is performed in the network layer.

Figure 12:
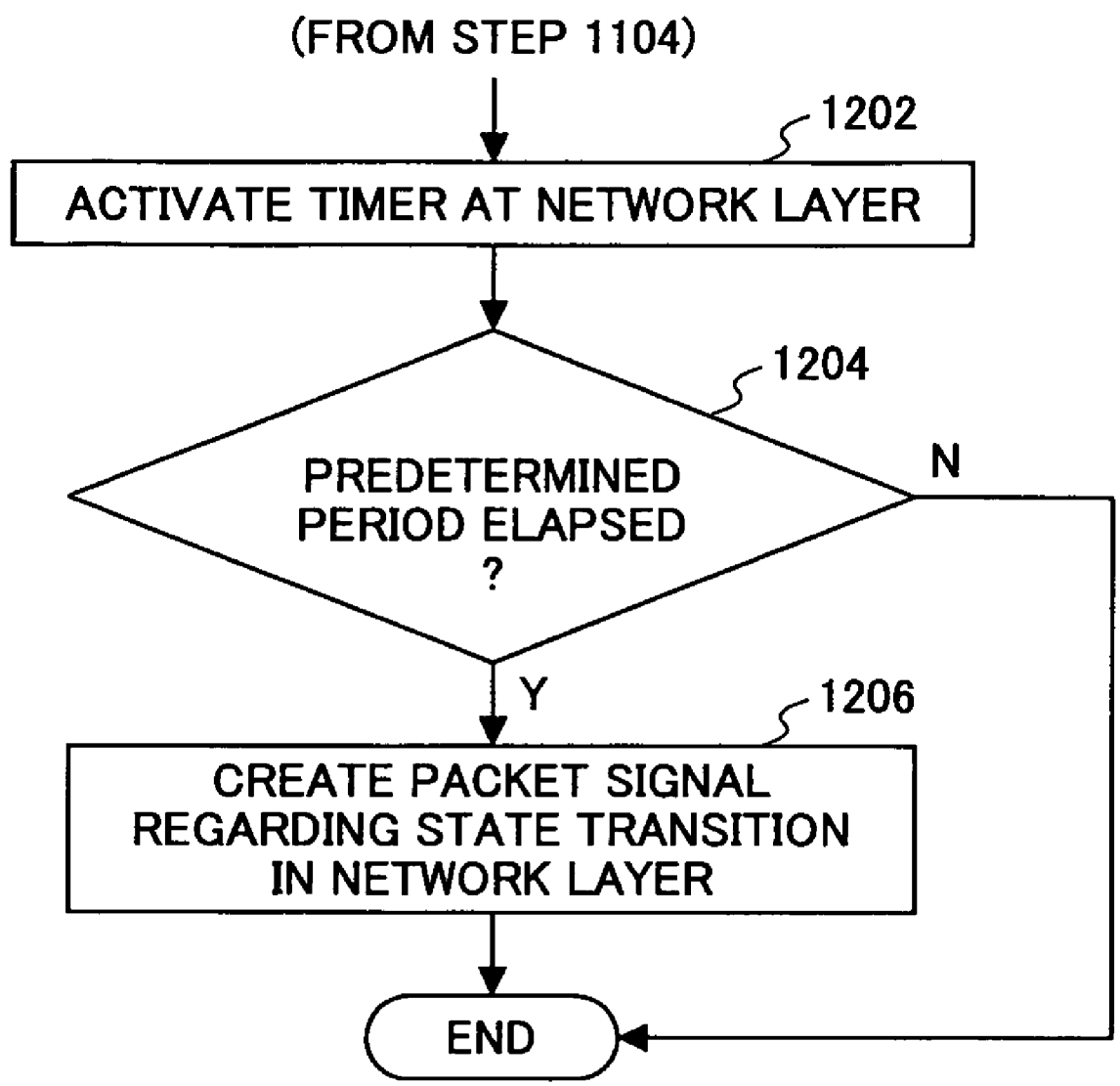
FIG. 12 is a flowchart illustrating details of a third process performed in the network layer.

FIG. 12 is a flowchart illustrating details of a third process performed at the network layer (step 1104). First, in step 1202, a timer in the network layer is activated. In other words, this equates to 2 timers being activated in the link and network layers with step 1102 in FIG. 11 and with step 1202 in FIG. 12.

In step 1204, whether a predetermined period has elapsed for a timer in the network layer is determined. When the period has not elapsed, the third process is terminated.

In step 1206, when the predetermined period has elapsed, a packet signal is created concerning state-transition information indicating that the state in the network layer should be transitioned to idle. It is noted that the timer is reset when a further packet signal transmission/reception is performed before a predetermined period that is set in advance elapses.

In step 1116, a fourth process (step 1116) is performed in the network layer.

Figure 13:
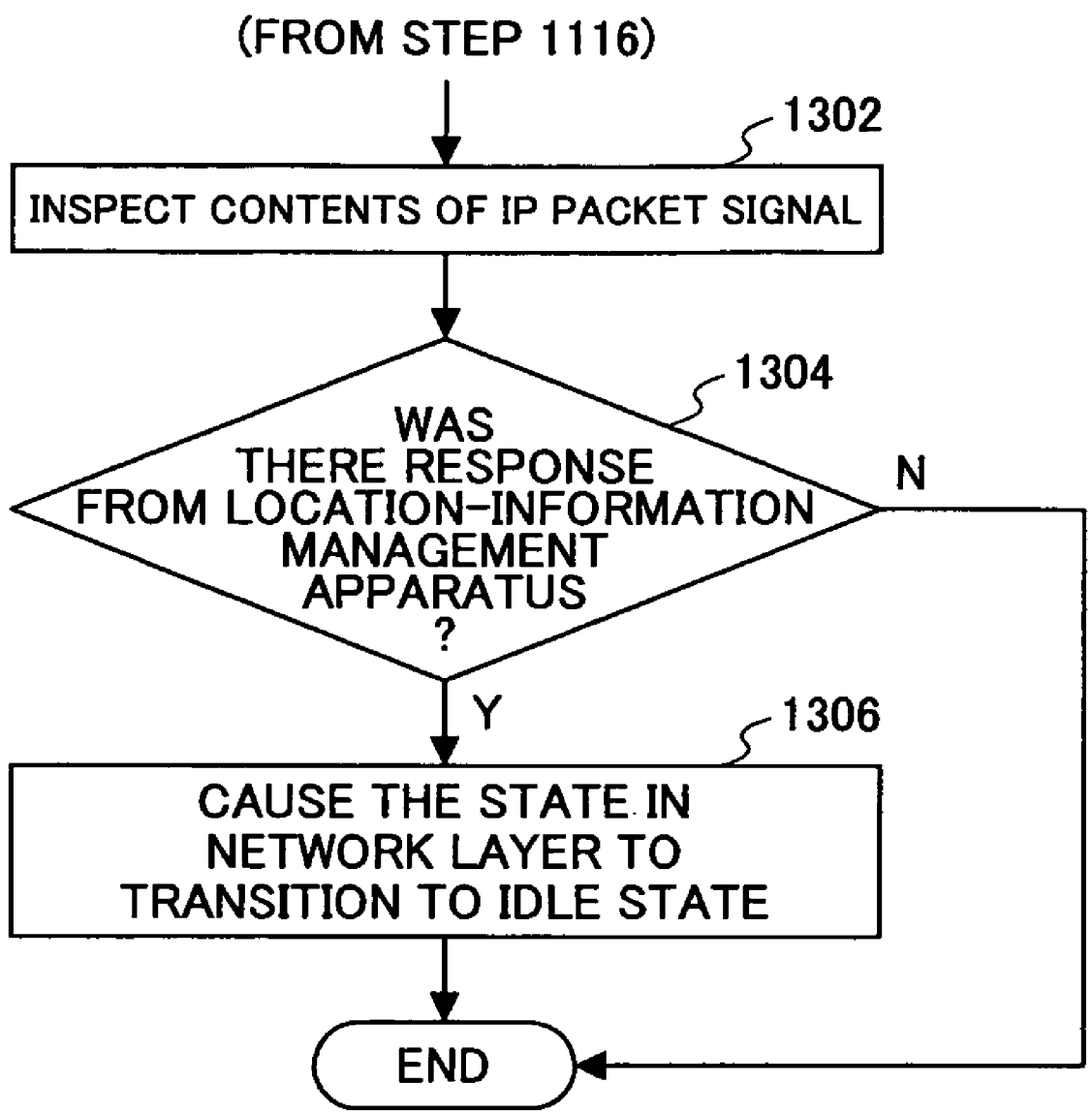
FIG. 13 is a flowchart illustrating details of a fourth process performed in the network layer.

FIG. 13 is a flowchart illustrating details of a fourth process performed in the network layer (step 1116). In step 1302, the mobile station 106 inspects a packet signal received from the wireless-base station 104 and determines whether a response from the location-information management apparatus 110 is included that is for the state-transition report of the network layer.

In step 1304, whether the response exists is determined. When there is no response, the state transition in the network layer is not performed so that the fourth process is terminated.

In step 1306, when there is such a response, the active state in the network layer is changed to the idle state so that the fourth process is terminated.

When the fourth process of the step 1116 in FIG. 11 is terminated, the process proceeds to step 1120 so that the flow is terminated. It is noted that step 1117 is a selective step that the below-described mobile station performs.

On the other hand, in the link layer, in step 1106, whether a predetermined period in the link layer has elapsed is determined. When the period has not elapsed, the flow is immediately terminated. Also in this case, the timer is reset when a transmission or reception of a further packet signal is performed before a predetermined period set up in advance has elapsed.

In step 1108, when the predetermined period has elapsed, a packet signal is created concerning a state-transition report indicating that the state in the link layer should be transitioned to idle.

In step 1110, the mobile station 106 transmits a packet signal to the wireless-base station 104. The important points to note are that this packet signal includes a state-transition report destined for the wireless-base station 104 as well as that, when the process of step 1209 in FIG. 12 is performed, the state-transition report destined for the location-information apparatus 110 is also included.

In step 1112, whether there exists a response from the state-transition report destined for the wireless-base station is determined. When there is no response, the process returns to step 1110.

In step 1114, when there is such a response, the state of the link layer is changed to idle. In other words, the mobile station 106 is deleted from the assignment table in the wireless-base station 104 so as to release the wireless link for the deleted mobile station 106.

In step 1118, the mobile station 106 performs the process in the idle state by discontinuously receiving the control signal from the wireless-base station.

A SECOND EMBODIMENT

Figure 14:
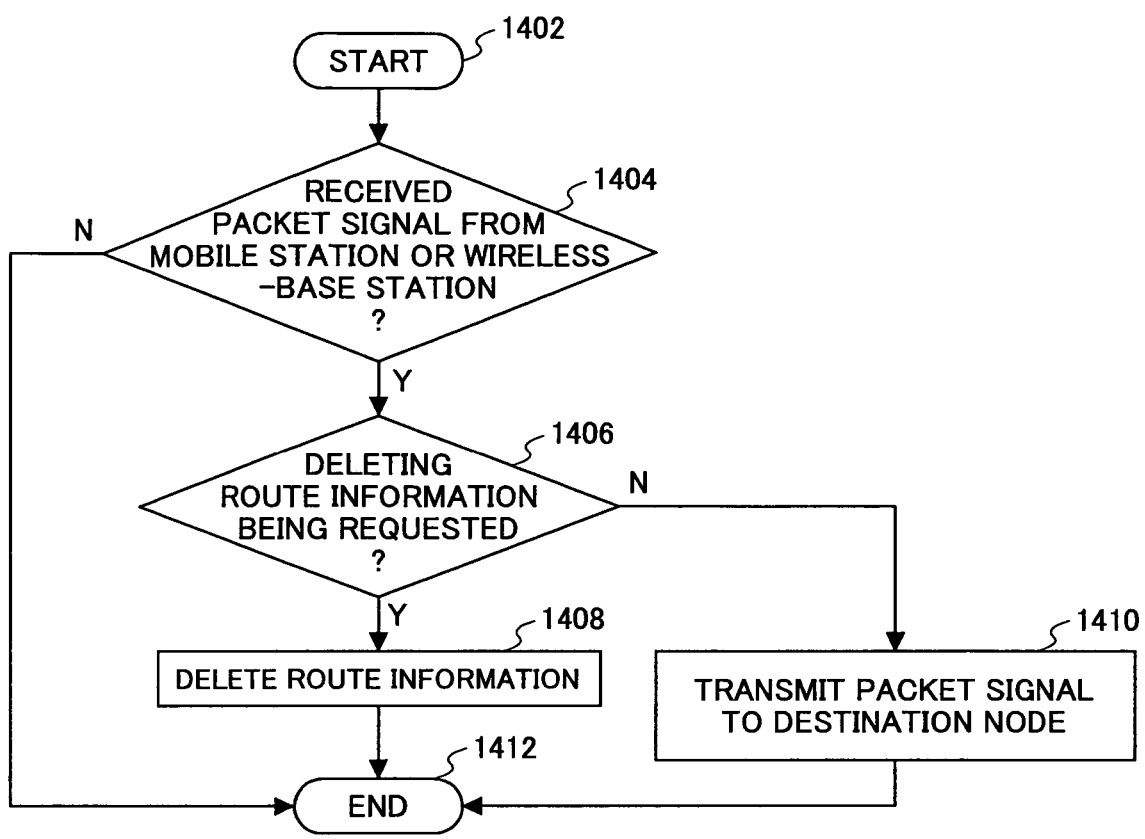
FIG. 14 is a flowchart showing operations of a line concentrator according to the present second embodiment.

FIG. 14 illustrates operations for deleting route information in a line concentrator of a mobile-communications system 100 according to the present second embodiment. In the first embodiment, a timer is activated in a line concentrator, and route information is deleted after a predetermined period has elapsed. On the other hand, in the second embodiment, route information is deleted based on a request from a mobile station 106 or a wireless-base station 104. The below-described flow of FIG. 14 can be executed in lieu of or in addition to the process represented by reference number 512 in the flowchart of FIG. 5 of the first embodiment.

The flow starts from step 1402 so that in step 1404 the line concentrator 108 determines whether a packet signal is received from the mobile station 106 or the wireless-base station 104. When the signal is not received, the flow is immediately terminated.

In step 1406, it is determined whether the packet signal received by the line concentrator 108 is a request to delete the route information.

In step 1408, if deleting the route information is being requested, the route information for the mobile station 106 indicated in the request is deleted so that the process proceeds to step 1412 for terminating the flow.

In step 1410, if deleting the route information is not being requested, the packet signal is transferred to the destination of the packet signal received by the line concentrator 108 and the flow is terminated.

It is noted that, when the wireless-base station 104 requests to delete the route information, it is possible to perform the process in a selective step 719 in FIG. 7, for example. Moreover, when the mobile station 106 requests to delete the route information, it is possible to perform the process in a selective step 1117 in FIG. 11.

As illustrated in the first and second embodiments, information concerning a transfer route which is not used for one of transmission and reception of a packet signal over a certain period can be deleted with a trigger of a timeout in a line concentrator, a wireless-base station, or a mobile station.

A THIRD EMBODIMENT

Figure 15:
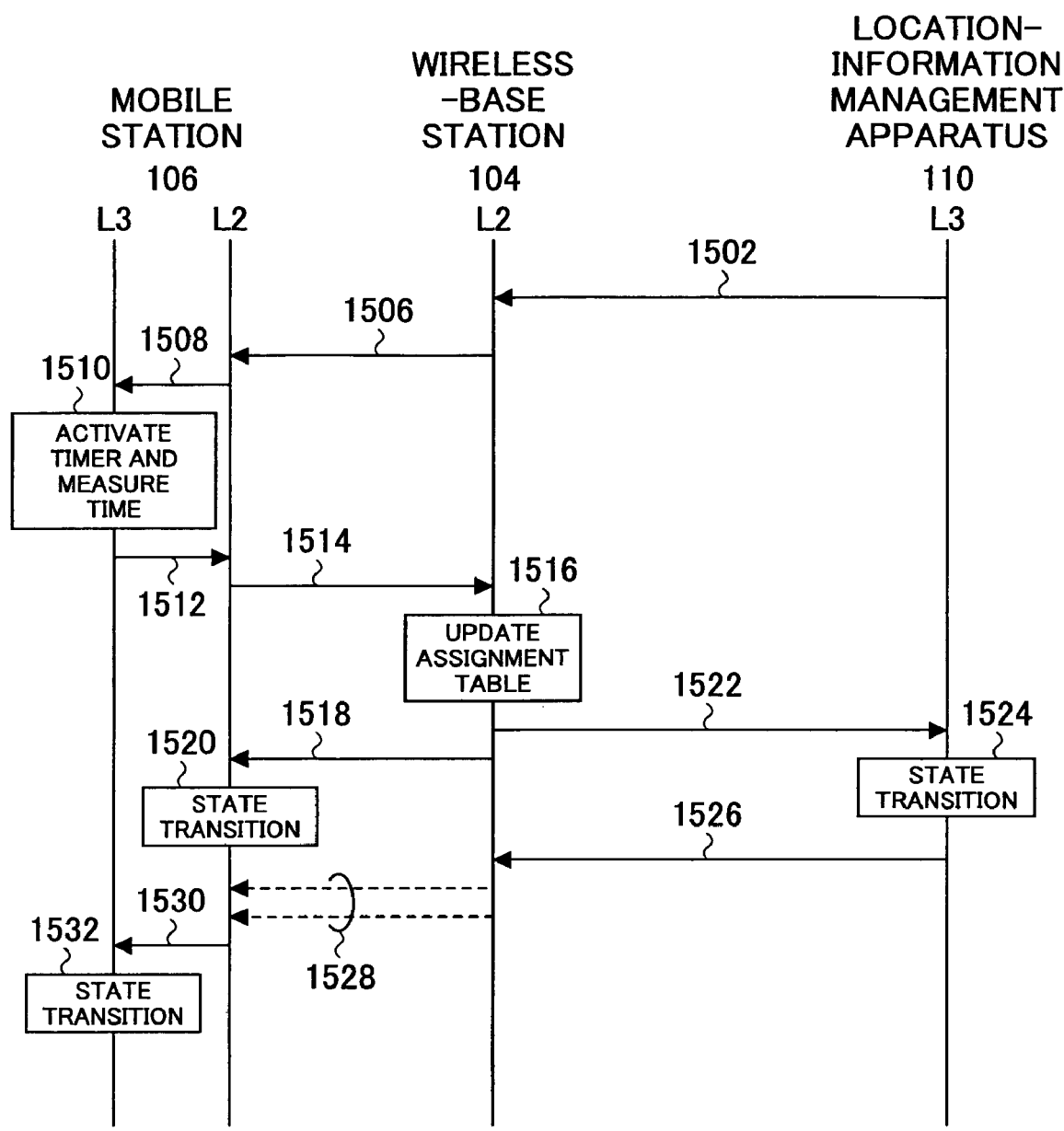
FIG. 15 is a flowchart showing operations in a mobile-communications system according to the present third embodiment.

FIG. 15 illustrates operations in a mobile-communications system 100 according to the present third embodiment. As different from the first and second embodiments, the present embodiment ties a state transition of one layer to a state transition of the other layer.

In step 1502 and 1506 it is assumed that the location-information management apparatus 110 sends to an active mobile station 106 a packet signal via a wireless link managed by the wireless-base station 104.

In steps 1508 and 1510 the mobile station 106 activates a timer in a network layer L3 and times a period for which no packet signals are transmitted/received in response to the fact that a packet signal is received from the wireless-base station 104. The timer is reset when a further packet signal is transmitted or received before a predetermined period set up in advance has elapsed.

In step 1512, when the predetermined period has elapsed in the network layer, the fact that the period has elapsed is reported to the link layer. Such reporting is performed using a control signal (a L2 trigger) for communicating between the layers.

In step 1514 the link layer that received the report creates a packet signal (a state-transition report) indicating that a transition should be made from the active state to the idle state and transmits the created packet to the wireless-base station 104.

In step 1516 the wireless-base station 104 updates the assignment table by deleting the mobile station 106 from the assignment table based on the state-transition report from the mobile station 106.

In step 1518 a response to the state-transition report (an affirmative-response signal authorizing a transition to the idle state) is transmitted to the mobile station 106 and a wireless link is released.

In step 1520 the mobile station 106 receives the response to the state-transition report and transfers to idle.

On the other hand, in step 1522 the wireless-base station 104 extracts an IP-packet signal in the network layer from the packet signal in the link layer and transmits to the location-information management apparatus 110 via the IP network 102 a packet signal indicating that the state of the mobile station 106 should be transitioned to idle (a state-transition report).

In step 1524 the location-information management apparatus 110 authorizes the contents of the state-transition report and changes the state of the mobile station 106 from active to idle.

In step 1526 a response signal for the state-transition report arrives at the wireless-base station 104 that transmitted the state-transition report in step 1522. The response signal for the state-transition signal is transmitted to the mobile station 106, the state of the link layer of which mobile station 106 being already idle.

In step 1528 the response signal is transmitted to the mobile station 106 using a control signal discontinuously transmitted from the wireless-base station 104.

In steps 1530 and 1532 the mobile station 106 receives the response signal for the state-transition report and transitions to the idle state in the network layer.

Figure 16:
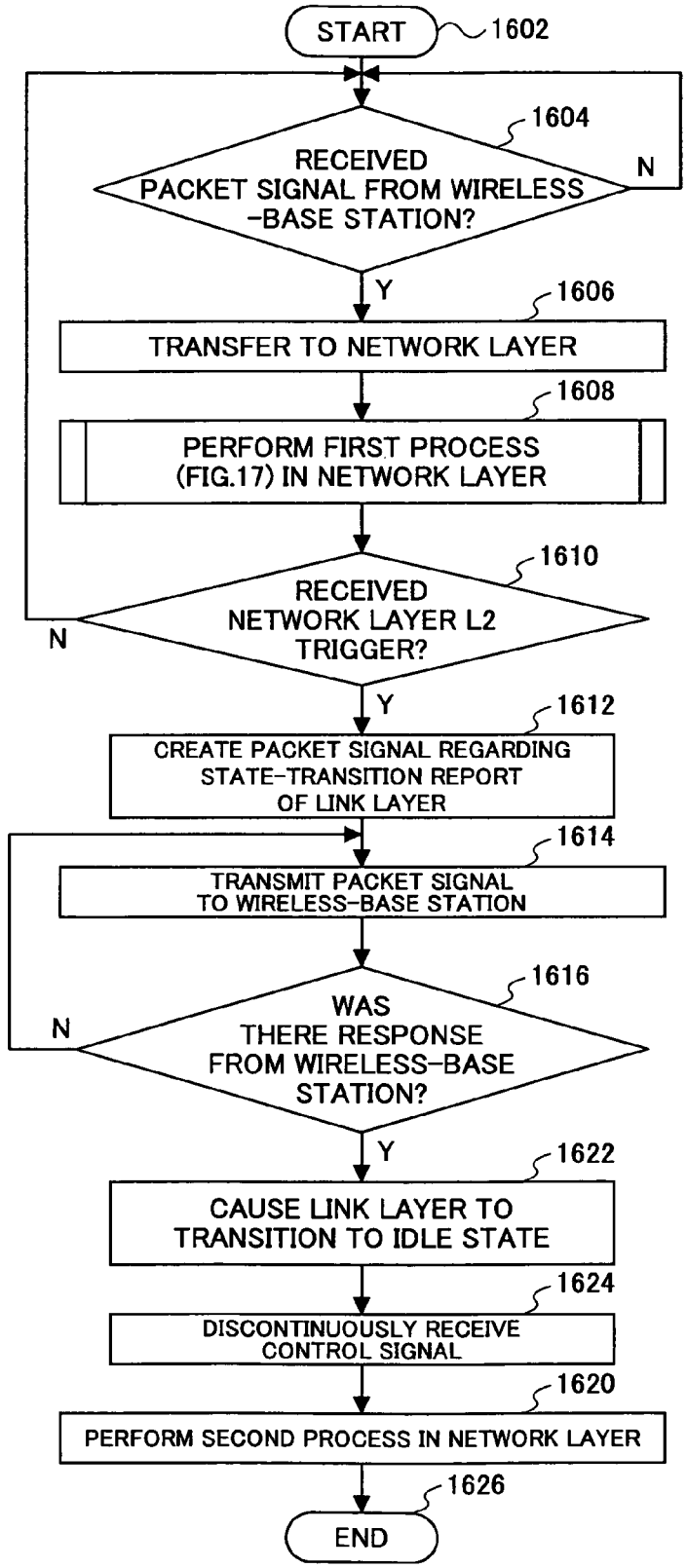
FIG. 16 is a flowchart showing operations of a mobile station according to the present third embodiment.

FIG. 16 shows details of operations of the mobile station 106 in a mobile-communications system 100 according to the present third embodiment. The flow starting from step 1602 primarily shows operations in the link layer of the mobile station 106. In step 1604, the mobile station 106 determines whether a packet signal is received from the wireless-base station 104 and, with respect to this flow, waits until the packet signal is received.

In step 1606, when the packet signal is received, the received signal is transferred to the network layer. Then, in step 1608 a first process in the network layer is performed.

Figure 17:
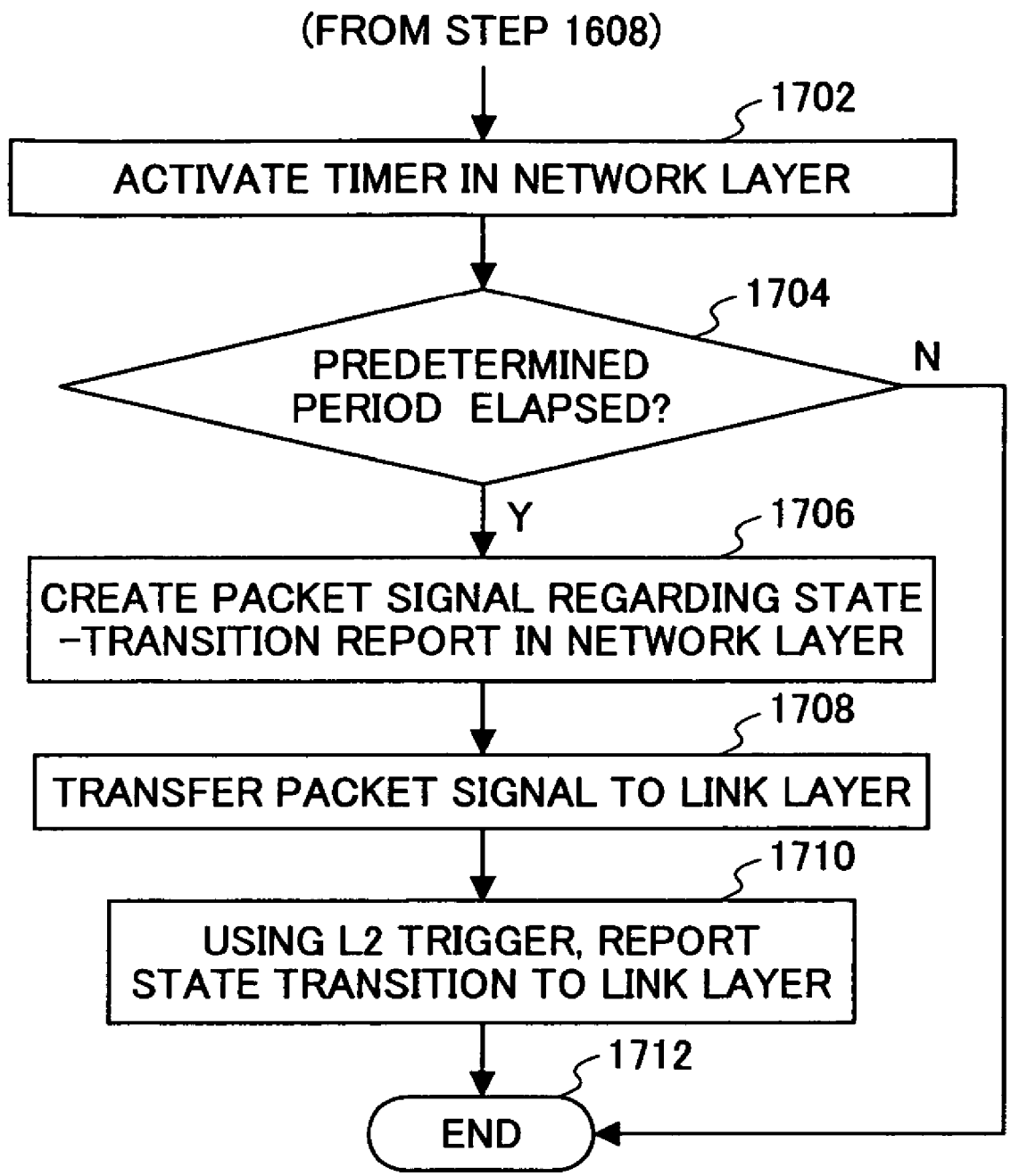
FIG. 17 is another flowchart showing the operations of the mobile station according to the present third embodiment.

FIG. 17 illustrates details of a first process in the network layer. When a packet signal arrives at the network layer, in step 1702 the mobile station 106 activates a timer in the network layer.

In step 1704 it is determined whether a predetermined period has elapsed. When a new signal is transferred from the link layer before the predetermined period has elapsed, for example, the first process in the network layer is terminated. In this case, a process is performed again starting from step 1604 in the link layer.

In step 1706, when the predetermined period has elapsed in step 1704, a packet signal is created concerning a state-transition indicating that the state in the network layer should be changed to idle.

In step 1708 this packet signal is transferred to the link layer. Moreover, in step 1710 the state-transition in the network layer is reported from the network layer L3 to the link layer L2 using a control signal for communicating between the layers (a L2 trigger). Then in step 1712 the first process in the network layer is terminated.

Returning to FIG. 16, when the first process in step 1608 is terminated, in step 1610 it is determined whether the L2 trigger is received from the network layer. When the L2 trigger is not received, the mobile station 106 returns to step 1604 so as to wait for a packet signal from the wireless-base station 104.

In step 1612, when the L2 trigger is received, a packet signal is created concerning a state-transition report indicating that the state in the link layer should be transitioned to idle.

In step 1614 the mobile station 106 transmits to the wireless-base station 104 a packet signal concerning the state-transition report of the link and network layers.

In step 1616 it is determined whether there exists a response from the wireless-base station 104 for the state-transition response of the link layer. If there is no response, the process returns to step 1614.

In step 1622, when there is a response in step 1616, the state transition of the link layer is performed so that the link layer becomes idle. In the wireless-base station 104, the mobile station 106 is deleted from the assignment table and the wireless link is released.

In step 1624 the mobile station 106 performs operations of the idle state of discontinuously receiving a control signal.

Subsequently, in step 1620 a second process in the network layer is executed. In the second process, first a state transition in the network layer is authorized by the location-information management apparatus 110 and whether the response for the state-transition report arrives at the mobile station 106 is determined. If the response does not arrive, the second process is terminated. If the response arrives, the state-transition in the network layer is performed so that the state becomes idle, terminating the second process. Then, the flow is terminated in step 1626.

Figure 18:
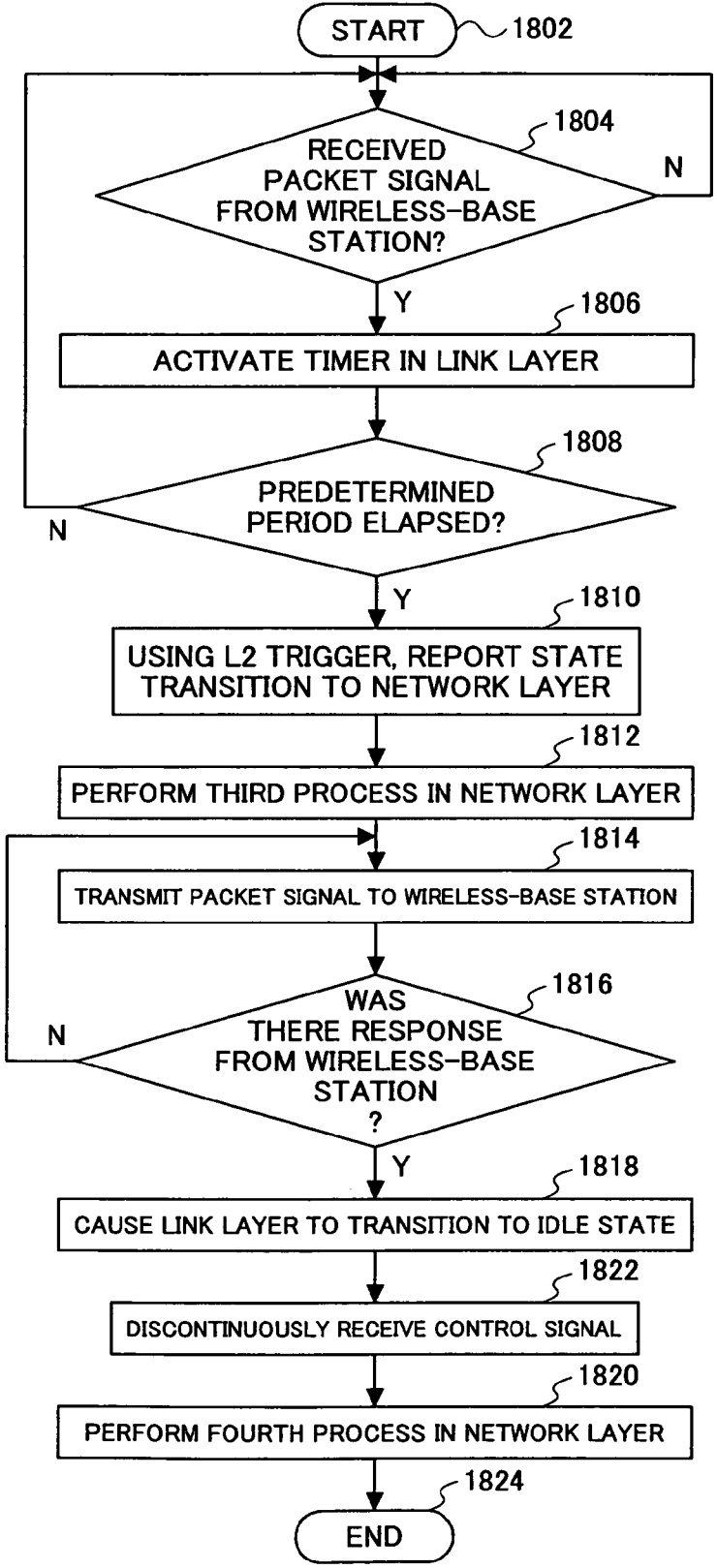
FIG. 18 is yet another flowchart showing the operations of the mobile station according to the present third embodiment.

FIG. 18 shows details of operations of the mobile station 106 in the mobile-communications system 100 according to the present third embodiment. In the examples illustrated in FIGS. 15 through 17, timer management is performed in an upper layer so that a state transition is reported to a lower layer. In a below-described example of FIG. 18, on the other hand, timer management is performed in a lower layer so that a state transition is reported to an upper layer, thereby maintaining the nature of one state transition being tied to the other state transition. The flow starting from step 1802 primarily shows operations in the link layer of the mobile station 106. In step 1804, the mobile station 106 determines whether a packet signal is received from the wireless-base station 104 and waits until the packet signal is received with respect to this flow.

In step 1806, when a packet signal is received, the mobile station 106 activates a timer in the link layer and measures the time elapsed.

In step 1808 it is determined whether a predetermined period has elapsed so that, when the period has not elapsed, the process returns to step 1804.

In step 1810, when the predetermined period has elapsed, the state change in the link layer is reported to the network layer using the L2 trigger.

In step 1812 a predetermined third process is performed in the network layer that receives such a report. In the third process, a packet signal is created concerning a state-transition report indicating that the state in the network layer should be changed to idle and the packet signal is transferred to the link layer.

In step 1814, when the third process is terminated, the mobile station 106 transmits to the wireless-base station 104 a packet signal concerning a state-transition report in the network and link layers.

In step 1816 it is determined whether there exists a response from the wireless-base station 104 for the link-transition report of the link layer. When there is no response, the process returns to step 1814.

In step 1818, when there is a response, the link layer is caused to transition to the idle state.

In step 1822 the mobile station 106 thereafter performs the process of the idle state of discontinuously receiving a control signal.

In step 1820 a fourth process in the network layer is also performed. In the fourth process, it is determined whether there exists a response for the state-transition report of the network layer. When there is no response, the fourth process is terminated without performing the state transition. When there is a response, the state transition in the link layer is performed so that the state becomes idle, terminating the fourth process and the flow.

A FOURTH EMBODIMENT

Figure 19:
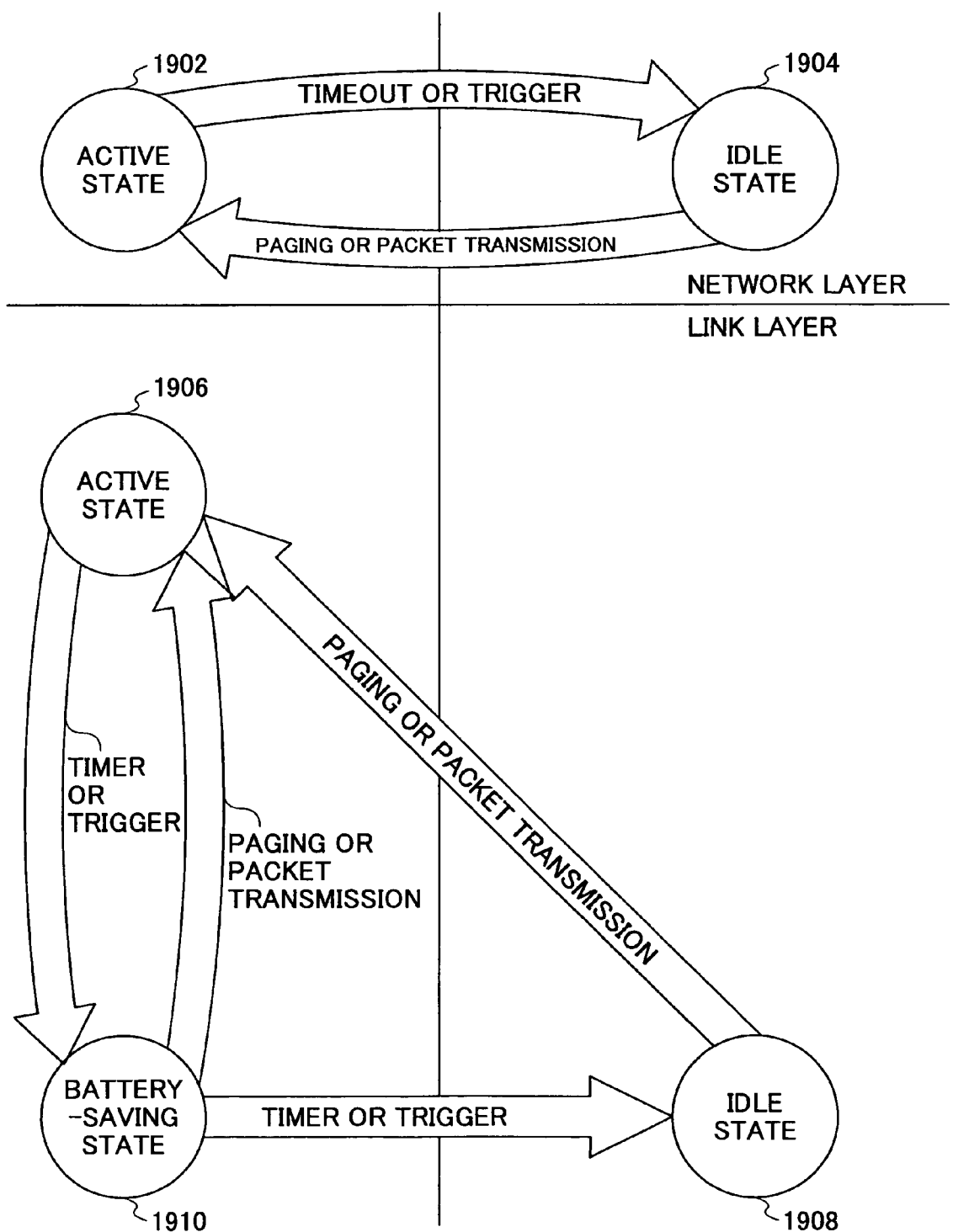
FIG. 19 is a state-transition diagram of a mobile station according to the present fourth embodiment.

FIG. 19 is a state-transition diagram of a mobile station 106 according to the present fourth embodiment. The state of the mobile station 106 in the present embodiment is managed in two states of an active state and an idle state in a network layer (L3). This point is the same as what is described in FIG. 2. In an active state 1902 in the network layer, the location-information management apparatus 110 keeps track of which cell the mobile station 106 belongs to. In an idle state 1904, the location-information management apparatus 110 keeps track of which location-registration area the mobile station 106 belongs to.

The state transition from the active state 1902 to the idle state 1904 can be performed when a packet signal is not received over a predetermined period in the active state. It is also possible to perform the state transition by using a direct control signal (a trigger) requesting a state transition. Moreover, a state transition from the idle state 1904 to the active state 1902 can be performed when the mobile station 106 is paged in order to transfer a packet signal destined for the mobile station 106 or in order for the mobile station to transmit a packet signal, for example.

The state of a mobile station 106 in a link layer (L2) is managed in three states of active, battery-saving, and idle. This point differs from what is described in conjunction with FIG. 2. In an active state 1906 in the link layer, the mobile station 106 can communicate through a wireless link established with a wireless-base station 104. In this case, the wireless-base station 104 keeps track in an assignment table on which mobile station 106 out of mobile stations controlled by the wireless base-station 104 has a wireless link established. In other words, the assignment table includes the fact that the mobile station 106 is active and information specifying the wireless link. In a battery-saving state 1910 and an idle state 1908, the wireless link is released and the mobile station 106 discontinuously receives a control signal transmitted from the wireless-base station 104. While information concerning the mobile station 106 in the battery-saving state 1910 is maintained in the assignment table in the wireless-base station 104, information concerning the mobile station 106 in the idle state 1908 is deleted from the assignment table. Moreover, as for route information managed in a line concentrator 108, while route information of the mobile station 106 in the battery-saving state 1910 is maintained, route information in the idle state 1908 is deleted.

A state transition from the active state 1906 to the battery-saving state 1910 and a state transition from the battery-saving state 1910 to the idle state 1908 can be performed when a packet signal is not received over a predetermined period or by using a direct control signal (a trigger) requesting a state transition, for example. Moreover, a state transition from the battery-saving state 1910 to the active state 1906 and a state transition from the idle state 1908 to the battery-saving state 1910 can be performed when the mobile station 106 is paged in order to transfer a packet signal destined for the mobile station 106 or in order for the mobile station 106 to transmit a packet signal, for example. When transitioning between such states as described above, the state in a link layer (a lower layer) of the mobile station 106 is managed by the wireless-base station 104 while the state in a network layer (an upper layer) of the mobile station 106 is managed by the location-registration management apparatus 110.

Figure 20:
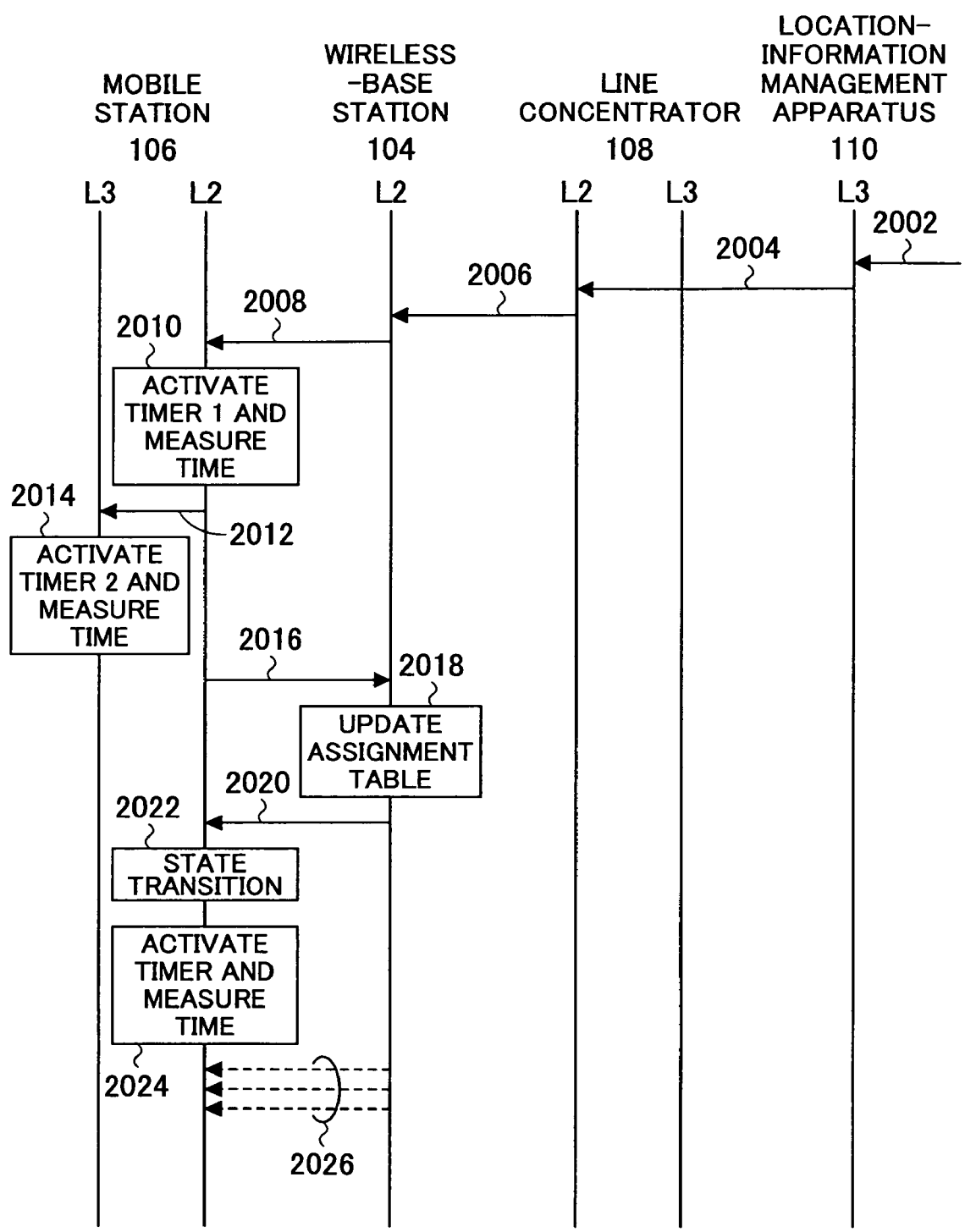
FIG. 20 is a flowchart showing operations in a mobile-communications system according to the present fourth embodiment.

FIG. 20 is a flowchart showing operations in a mobile-communications system 100 according to the present fourth embodiment. This flowchart is associated with operations for the mobile station 106 to transition from active to battery-saving. For ease of explanation, it is assumed that the upper and lower layers are initially active. In steps 2002, 2004, 2006 a packet signal destined for the mobile station 106 is transmitted to the wireless-base station 104 to which the mobile station 106 belongs. Then in step 2008 the packet signal is transmitted to the mobile station 106 through a wireless link established.

In step 2010, when conducting transmission/reception of a signal with the wireless-base station 104, the mobile station 106 activates a timer 1 in the link layer. Moreover, in steps 2012 and 2014 a timer 2 in the network layer is also activated. In the present embodiment, it is envisaged that a predetermined period measured by the timer 1 in the link layer is shorter than a predetermined period measured by the timer 2 in the network layer 2.

In step 2016, when a timeout of the timer 1 in the link layer occurs so that a predetermined period has elapsed, the mobile station 106 creates a packet signal indicating a state-transition report so as to transmit the created packet signal to the wireless-base station 104. The state-transition report indicates that the mobile station 106 should transition from active to battery-saving.

In step 2018 the wireless-base station 104 that received the state-transition report updates the assignment table by changing the state of the mobile station 106 being managed in the assignment table from active to battery-saving.

In step 2020 and 2022 the mobile station 106 that receives a response to the state-transition report releases the wireless link and transitions to the battery-saving state.

In step 2024 the mobile station 106 that has undergone the state transition to the battery-saving state activates the timer 2 associated with the state-transition to the active state.

In step 2026 the mobile station 106 in this state discontinuously receives a control signal from the wireless-base station 104.

Figure 21:
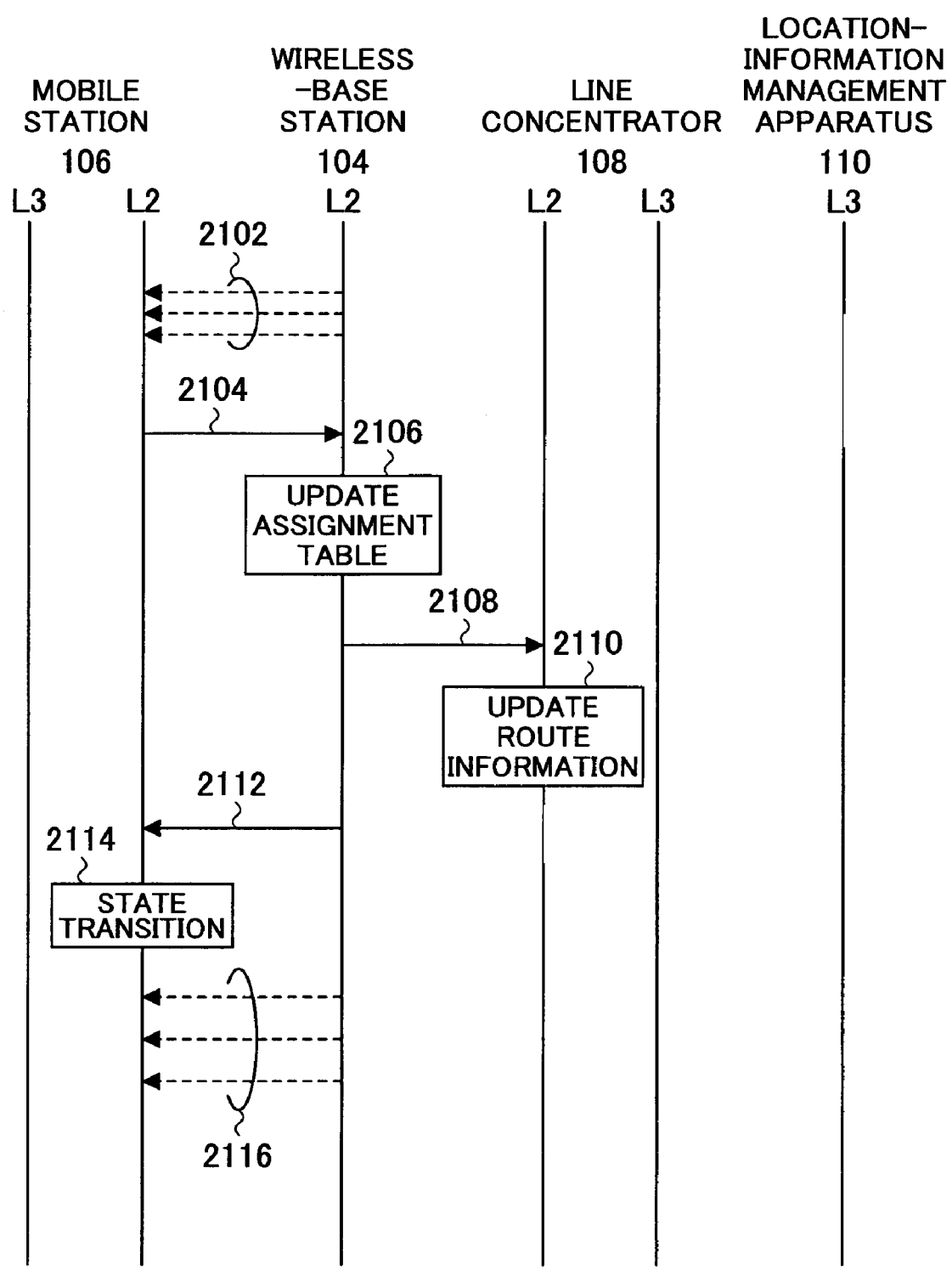
FIG. 21 is another flowchart showing the operations in the mobile-communications system according to the present fourth embodiment.

FIG. 21 is a continuation of the flowchart in FIG. 20. In step 2102 the mobile station 106 in the battery-saving state discontinuously receives a control signal.

In step 2104, when the mobile station 106 does not transmit to the wireless-base station 104 a signal over a predetermined period, a packet signal concerning a state-transition report is created so as to be transmitted to the wireless-base station 104. This state-transition report indicates that the mobile station 106 should transition from battery-saving to idle. As a wireless channel for the mobile station 106 to transmit to the wireless-base station 104 the state-transition report, a common channel for random access not requiring a dedicated channel allocation can be used, for example, but it is not limited to such example so that it is possible to use any wireless channel over which a state transition can be reported.

In step 2106 the wireless-base station 104 that receives a state-transition report deletes information concerning the mobile station 106 from the assignment table. Moreover, as illustrated in step 2108, a request for deletion of route information concerning the mobile station 106 is sent to the line concentrator 108.

In step 2110 the line concentrator deletes route information concerning the mobile station 106 in response to this request.

In step 2112 and 2114 the mobile station 106 that receives a response to the state-transition report transitions to idle.

In step 2116 the mobile station 106 discontinuously receives a control signal from the wireless-base station 104. It is noted that a period of intermittent reception in the battery-saving state (a period of discontinuous transmission in the wireless-base station) and a period of intermittent reception in the idle state may be the same, or one may be set longer than the other. For example, a battery-saving mobile station is likely to revert to active so that, from a point of view of speedily paging, it is advantageous to set a period of discontinuous transmission of the battery-saving wireless-base station shorter than a period of the idle one.

The state-transition of step 2114 may be performed after a response signal from the wireless-base station 104 is received or immediately after transmitting the state-transition report of step 2104. Moreover, it is also possible that a mobile station 106 that has undergone a state transition to the battery-saving state and a wireless-base station that has detected the state transition activate a timer 3 so that after a predetermined period has elapsed, the respective stations individually perform a state transition to idle without sending a report on the transition to idle. In this way, it is advantageous in that both parties may perform a state transition without using a common channel as in step 2104.

It is noted that when the time measured with the timer 2 of the network layer that is measured in step 2014 of FIG. 20 exceeds a predetermined period, the procedures (the embodiment 1 through 3) on the state transitions to idle in the network layer that are described above are executed.

Figure 22:
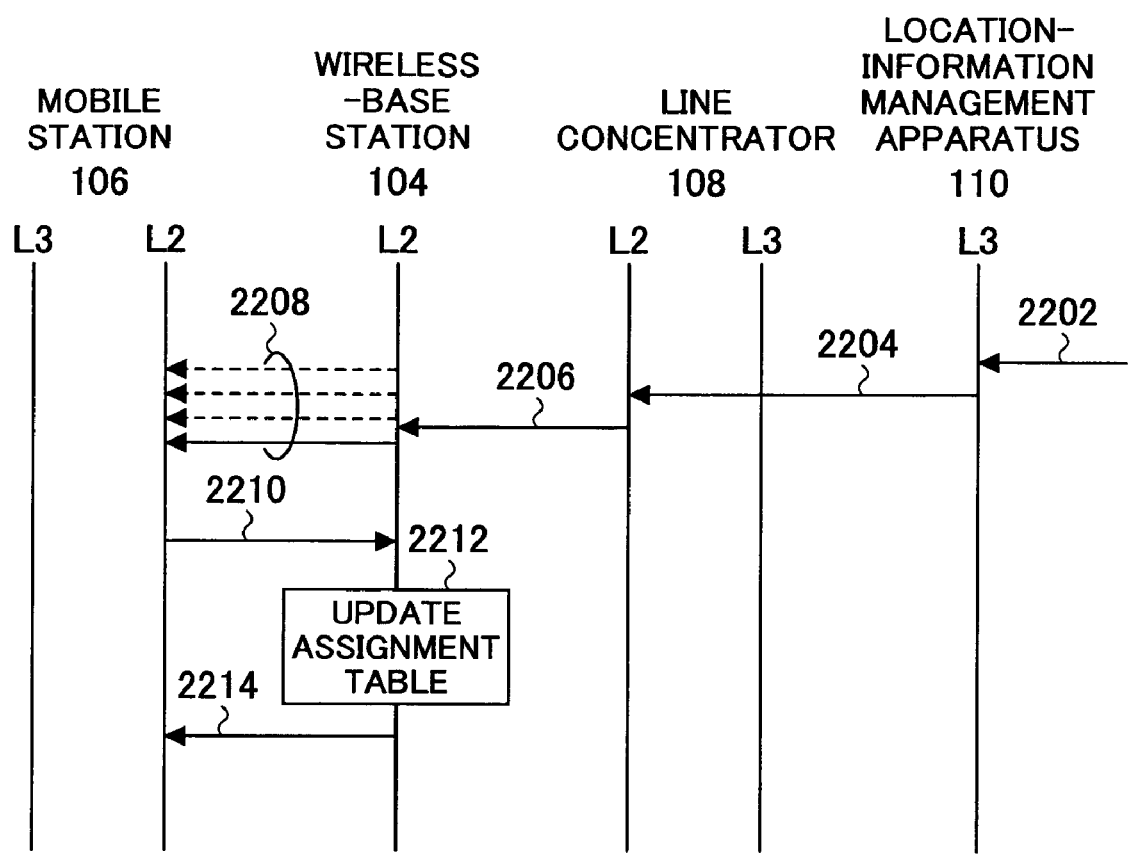
FIG. 22 is yet another flowchart showing the operations in the mobile-communications system according to the present fourth embodiment.

FIG. 22 illustrates the operations for paging the mobile station 106 in the battery-saving state. In steps 2202, 2204 and 2206, when the network layer is active, a packet signal destined for the mobile station 106 is transmitted to the wireless-base station 104 to which the mobile station 106 belongs. Though not illustrated, when the network layer is idle, the packet signal is transmitted to all wireless-base stations 104 belonging to a location-registration area for the mobile station 106. As described above, in the battery-saving state, route information for the mobile station 106 is maintained in the line concentrator 108 without being deleted so that the line concentrator 108 that receives the packet signal can transfer the packet signal to the wireless-base station 104 to which the mobile station 106 belongs.

In step 2208 the wireless-base station 104 inspects the assignment table so as to determine whether the mobile station 106 is being managed. In the battery-saving state, information concerning the mobile station 106 is maintained in the assignment table. Then, the wireless-base station 104 temporarily buffers the packet signal so as to accumulate the buffered packet signal. Then the wireless-base station 104 creates a paging packet for paging the mobile station 106 and discontinuously transmits the created paging packet.

In step 2210 the mobile station 106 that receives this paging packet creates a packet signal reporting on a state transition to the idle state and transmits the created packet signal to the wireless-base station 104.

In step 2112 the wireless-base station 104 establishes a wireless link and changes the state of the mobile station 106 in the assignment table to active.

In step 2214 the wireless-base station 104 uses the established wireless link to transmit to the mobile station 106 the accumulated packet signal.

Figure 23:
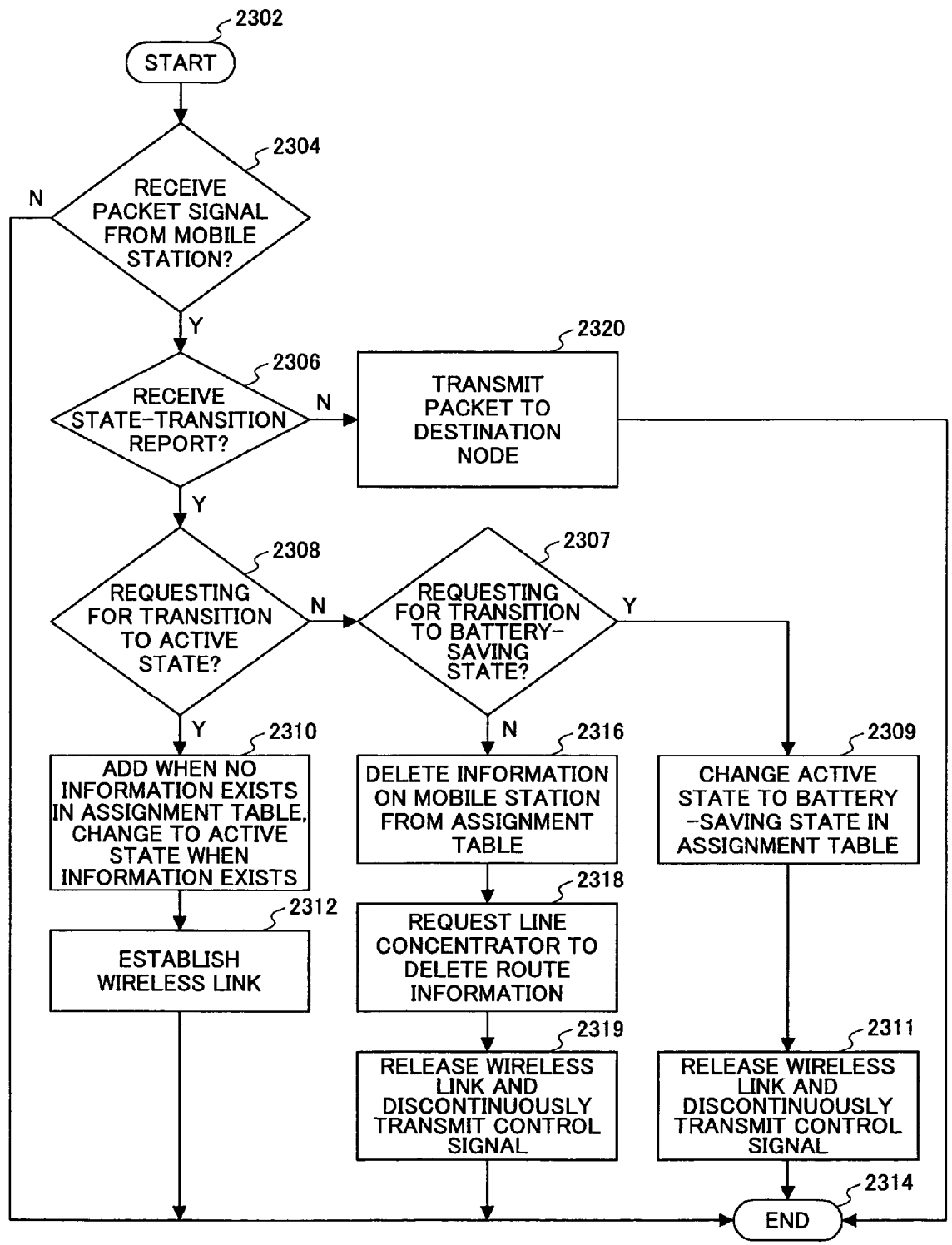
FIG. 23 is a flowchart showing operations of a wireless-base station according to the present fourth embodiment.

FIG. 23 is a flowchart showing, out of operations performed in the wireless-base station 104, those when a packet signal is received from the mobile station 106. This flow starts from step 2302 so that in step 2304 it is determined whether a packet signal is received from the mobile station 106. When the packet signal is received, the process proceeds to step 2306.

In step 2306 it is determined whether a state-transition report is included in the received packet signal. When the report is included, the process proceeds to step 2308.

In step 2308 it is determined whether the state-transition report is one requesting a state transition to the active state. When the report is one requesting the state transition to the active state, the process proceeds to step 2310.

In step 2310, the state transitions from battery-saving to active. In this case, information concerning the mobile station 106 is updated to reflect the active state.

In step 2312 a wireless link is established so that the flow terminates in step 2314.

On the other hand, when there is no request for the state transition to the active state in step 2308, in step 2307 it is determined whether the state-transition report is one requesting a state transition to the battery-saving state. If the outcome of the determination is negative, the process proceeds to step 2316.

When the process proceeds to step 2316, the state transition to the idle state is requested. Thus, information concerning the mobile station is deleted from the assignment table in the wireless-base station 104.

In step 2318 the wireless-base station 104 requests the line concentrator 108 to delete route information for the mobile station 106. In the line concentrator 108, the route information is deleted in response to this request.

In step 2319 a wireless link is released and the wireless-base station 104 discontinuously transmits a control signal to the mobile station 106 controlled by the wireless-base station 104.

On the other hand, in step 2320, when the state-transition report is not received in step 2306, the packet signal is transferred to the destination node of the packet signal so that the flow is terminated.

When it is determined in step 2307 that the state-transition report is one requesting a state transition to the battery-saving state, in step 2309 the state of the mobile station 106 is changed from active to battery-saving in the assignment table.

In step 2311 the wireless link is released and the wireless-base station 104 discontinuously transmits a control signal to the mobile station 106 controlled by the wireless-base station 104 so that the flow is terminated. As described above, the period of the discontinuous transmission in step 2319 may be the same as or different from what is in step 2311.

Figure 24:
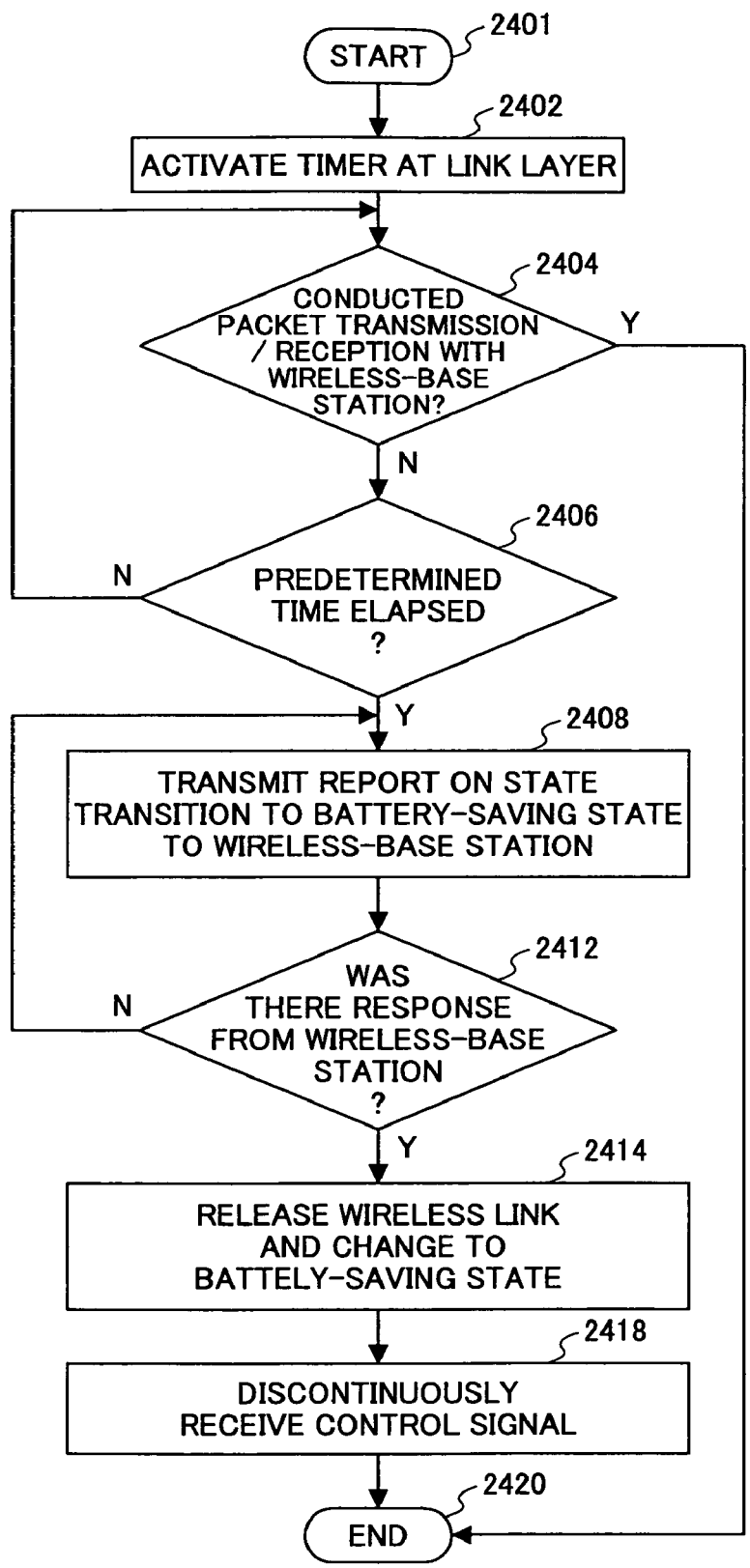
FIG. 24 is a flowchart showing operations of a mobile station according to the present fourth embodiment.

FIG. 24 shows operations of a mobile station 106 transitioning to the battery-saving state. First in step 2402 a timer in the link layer is activated.

In step 2404, it is determined whether the mobile station 106 has performed transmission/reception of a signal with the wireless-base station 104 so that when the transmission/reception has been performed the process proceeds to step 2420, immediately terminating the flow.

In step 2406, it is determined whether the timer in the link layer has exceeded a predetermined period. When it has not exceeded the predetermined period, the process returns to step 2404.

In step 2408, when the predetermined period has elapsed, a packet signal concerning a state-transition report is created and is transmitted to the wireless-base station 104. The state-transition report indicates that the state in the link layer should be transitioned from active to battery-saving.

In step 2412, it is determined whether there exists a response to the state-transition report destined for the wireless-base station 104. When there is no response, the process returns to step 2408.

In step 2414, when there is a response, the state of the link layer is changed to the battery-saving state. In other words, while maintaining the assignment table in the wireless-base station 104 and the route information in the line concentrator 108, the wireless link is released.

As illustrated in step 2418, thereafter the mobile station 106 discontinuously receives a control signal from the wireless-base station 104.

Figure 25:
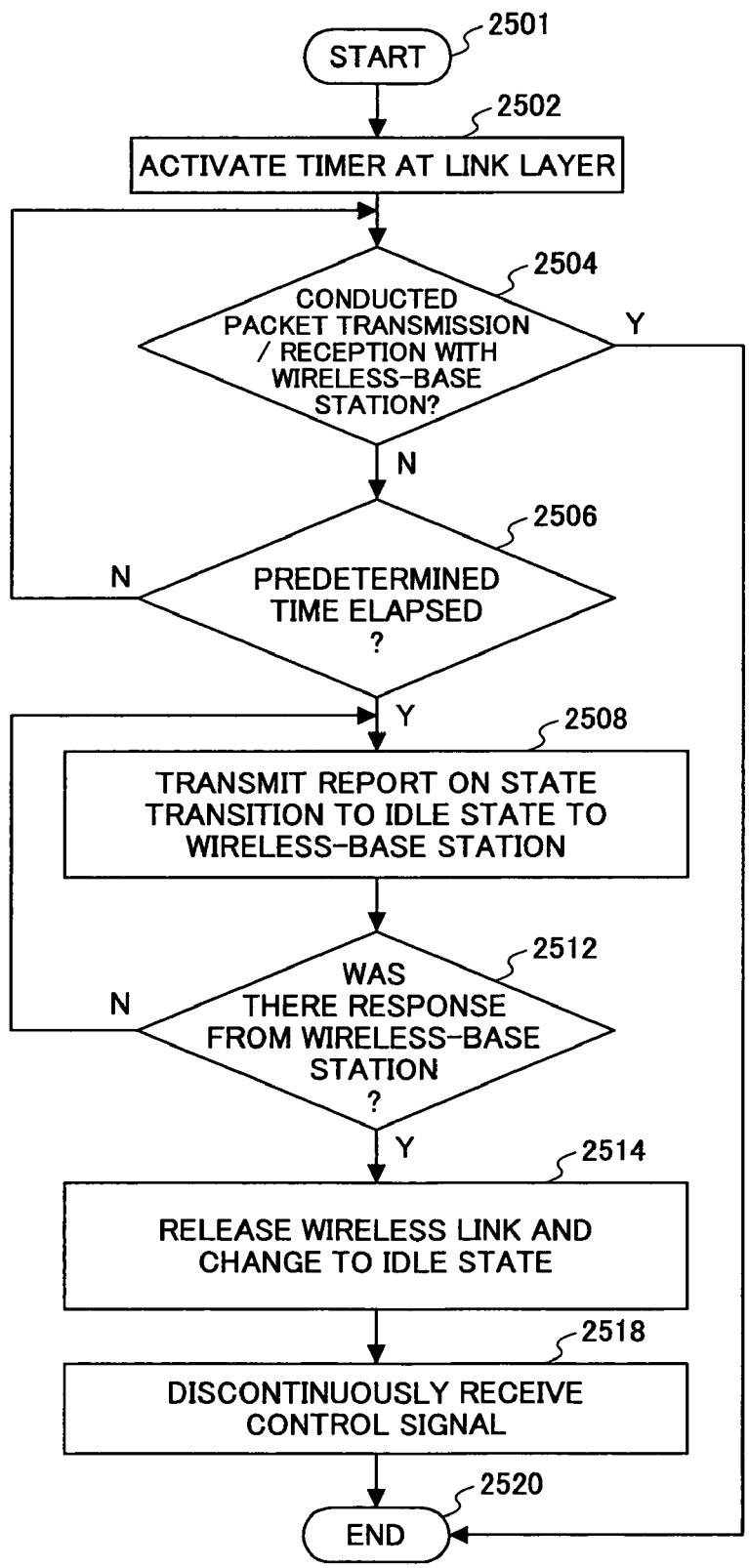
FIG. 25 is another flowchart showing the operations of the mobile station according to the present fourth embodiment.

FIG. 25 shows the operations of the mobile station 106 transitioning to the idle state. First in step 2502 a timer in the link layer is activated.

In step 2504, it is determined whether the mobile station 106 has performed transmission/reception of a signal with the wireless-base station 104, and when the transmission/reception has been performed, the process proceeds to step 2520 so that the flow is immediately terminated.

In step 2506, it is determined whether a timer in the link layer has exceeded a predetermined period. When it has not, the process returns to step 2504.

In step 2508, when a predetermined period has elapsed, a packet signal concerning a state-transition report is created so as to be transmitted to the wireless-base station 104. The state-transition report indicates that the state in the link layer should be transitioned from the battery-saving state to the idle state.

In step 2512, it is determined whether there exists a response to the state-transition report destined for the wireless-base station 104. When there is no response, the process returns to step 2508.

In step 2514, when there is a response, the state of the link layer is changed to the battery-saving state. In other words, the wireless link is released and the assignment table in the wireless-base station 104 and the route information in the line concentrator 108 are also deleted.

In step 2518, thereafter the mobile station 106 discontinuously receives a control signal from the wireless-base station 104.

A FIFTH EMBODIMENT

In the mobile-communications system 100 of the first embodiment, the packet signal destined for the idle mobile station 106 is buffered in the wireless-base station 104 or location-information management apparatus 110 so that the packet signal is transmitted after transitioning to the active state. In a fifth embodiment, a packet signal is transmitted without performing such buffering as described above. This can be executed as follows, for example. First, it is determined whether the mobile station 106 to be the destination of the packet signal is being managed in the assignment table of the wireless-base station 104. When it is not being managed by the table, a paging packet is created so that the created packet is transmitted to the mobile station 106 controlled by the wireless-base station with a control signal discontinuously transmitted in step 312. In this case, the wireless-base station 104 encapsulates in a packet signal destined for the mobile station that is received from the line concentrator 108 a paging signal for the mobile station 106 so that the paging signal encapsulated in the packet signal is discontinuously transmitted. Hereby, it is made possible to transmit, without buffering, a packet signal to the mobile station 106. Neither buffering nor establishing a wireless link is needed so that it is made possible to speedily deliver a packet signal.

It is noted that it is possible to perform the same process when there is also a battery-saving state in the states of the mobile station 106 as in the fourth embodiment. In other words, in step 310 an assignment table is inspected. When the mobile station 106 is being managed in the assignment table, it is determined whether the state of the mobile station is active or battery-saving, while when the mobile station 106 is not being managed in the assignment table, the mobile station is idle. Thus, the mobile station 106, when not active, can discontinuously receive a packet signal into which is encapsulated a paging signal.

A wireless-base station 104 in the present embodiment performs generally the same operations as what is illustrated in FIG. 6 so that in step 608 the assignment table is inspected. When the mobile station 106 is not being managed in the assignment table, the encapsulating as described above is performed when creating the paging packet signal in step 614. In other words, an encapsulation is performed on a packet signal received from the line concentrator by inserting a paging signal for the mobile station 106. Then, in step 616, the wireless-base station 104 discontinuously transmits the encapsulated signal.

It is noted that when there may be a battery-saving state, in step 608 it is determined whether the mobile station 106 is being managed in the assignment table so that when it is being managed in the table, whether the mobile station 106 is active or battery-saving is determined. When it is not being managed in the table, the mobile station is idle. Then, the same processes are performed thereafter.

The present application is based on PCT application JP2003/014655, filed Nov. 18, 2003, and Japanese Priority Patent Application No. 2002-335720 filed Nov. 19, 2002 with the Japanese Patent Office, the entire contents of which are hereby incorporated by reference.

What is claimed is:

1. A mobile-communications system, comprising:
a mobile station;
a wireless-base station enabled to communicate with the mobile station; and
a location-information management apparatus for managing a state of the mobile station in a network layer upper to a link layer for managing wireless-communications resources;
wherein said mobile station is provided with wireless-communications means for transmitting and receiving a signal with the wireless-base station in an active state in the link layer for managing the wireless-communications resources, discontinuous-receiving means for discontinuously receiving a control signal from said wireless-base station in the link layer in a state different from the active state, and first state-management means for creating a state-transition signal in response to a paging signal included in said control signal,
wherein said location-information management apparatus is provided with second state-management means for managing whether the state of said mobile station in the network layer is active or idle, and area-management means for managing information regarding a cell to which the mobile station in the active state belongs and information regarding a location-registration area to which the mobile station in the idle state belongs,
wherein a period in which the mobile station in the active state is neither transmitting nor receiving is measured in the link layer and in the network layer so that the state of said mobile station is changed to a state different from the active state when the period exceeds a predetermined period,
wherein a signal destined for the mobile station in the state different from the active state in at least one of the network layer and the link layer is accumulated in said location-information management apparatus or said wireless-base station, and the signal destined for said mobile station is transmitted after the state of said mobile station is changed to the active state, or discontinuously transmitted to said mobile station with the paging signal of said mobile station created in said wireless-base station,
and wherein management of state transition of the mobile station in the network layer and management of state transition of the mobile station in the link layer are performed independently.

2. A location-information management apparatus for use in a mobile-communications system having a mobile station for conducting wireless communications in an active state in a link layer and for discontinuously receiving a control signal in a state different from said active state, and a wireless-base station for communicating with the mobile station, comprising:
state-management means for managing whether the state of the mobile station in a network layer upper to the link layer for managing wireless-communications resources is active or idle;
area-management means for managing information regarding a cell to which the mobile station in said active state belongs and information regarding a location-registration area to which said mobile station in said idle state belongs; and
timer means for timing a period in which a signal transmission associated with the mobile station is not being performed;
wherein the state of said mobile station in the network layer is changed to a state different from the active state when the period exceeds a predetermined period,
and wherein, when a signal destined for the mobile station in the idle state in the network layer is accumulated, a paging signal for paging said mobile station is transmitted to a plurality of the wireless-base stations, a state-transition signal created by said mobile station in response to said paging signal is received, and the signal accumulated that is destined for said mobile station is transmitted in response to a state-transition report indicating that the mobile station undergoes a state transition.

3. A wireless-base station for use in a mobile-communications system having a location-information management apparatus for managing a state of a mobile station in a network layer upper to a link layer, comprising:
communications means for wirelessly communicating with the mobile station in an active state in the link layer for managing wireless-communications resources;
discontinuous-transmitting means for discontinuously transmitting control information to the mobile station in a state different from said active state;
management means for managing information pertaining to the mobile station wirelessly communicating; and
timer means for timing a period in which the mobile station in the active state neither transmits nor receives;
wherein, in the location-information management apparatus, whether the state of said mobile station in said network layer is active or idle is managed, and information regarding a cell to which the mobile station in said active state belongs and information regarding a location-registration area to which the mobile station in said idle state belongs are managed,
wherein the state of said mobile station is changed to a state different from the active state when the period timed with said timer means exceeds a predetermined period,
and wherein, when a signal destined for the mobile station in a state different from the active state is received in the link layer, a state-transition signal created by said mobile station in response to a paging signal for paging said mobile station is received, and in response to the state-transition signal indicating that a state transition should be performed, the signal accumulated that is destined for said mobile station is transmitted, or the paging signal and the signal destined for said mobile station are discontinuously transmitted.

4. The wireless-base station as claimed in claim 3, wherein said management means deletes information pertaining to the mobile station transitioned to the idle state in said link layer that is different from the active state from an assignment table for managing a mobile station which establishes a wireless link so as to communicate.

5. A mobile station enabled to communicate with a wireless-base station, comprising:
   wireless-communications means for transmitting and receiving a signal with the wireless-base station in an active state in a link layer for managing wireless-communications resources;
   discontinuous-receiving means for discontinuously receiving a control signal from said wireless-base station in a state different from said active state;
   state-management means for creating a state-transition signal in response to a paging signal included in said control signal; and
   timer means for timing a period in which neither transmission nor reception takes place in said active state;
   wherein whether a state of said mobile station in a network layer upper to the link layer is active or idle is managed by a location-information management apparatus, and in the location-information management apparatus, information pertaining to a cell to which said mobile station in said active state belongs and information pertaining to a location-registration area to which said mobile station in said idle state belongs are managed,
   wherein the state of said mobile station transitions to a state different from the active state when the period timed with said timer means exceeds a predetermined period,
   and wherein, when in a state different from the active state in at least one of said network layer and said link layer, after said state-transition signal is transmitted, the signal accumulated in said location-information management apparatus or said wireless-base station is received, or the paging signal and a signal destined for the mobile station itself are discontinuously received from said wireless-base station.

6. The mobile station as claimed in claim 5 that is further adopted to change, in response to changing the state in one of said link layer and said network layer, the state of the other of said link layer and said network layer.

7. A communications method for use in a mobile-communications system consisting of a mobile station, a wireless-base station enabled to communicate with said mobile station, and a location-information management apparatus for managing a state of the mobile station in a network layer upper to a link layer for managing wireless-communications resources, comprising the steps of:
   the mobile station, in an active mode in said link layer for managing the wireless-communications resources, receiving a signal from the wireless-base station;
   timing, in the link layer and in the network layer, a period in which said mobile station neither transmits nor receives after receiving said signal;
   transmitting to said wireless-base station, when the period timed in the link layer has exceeded a predetermined period, a state-transition signal indicating that a state in the link layer of said mobile station should transition to a state different from the active state;
   transmitting to said location-information management apparatus, when the period timed in the network layer has exceeded a predetermined period, a state-transition signal indicating that the state in the network layer of said mobile station should transition to an idle state; and
   said mobile station discontinuously receiving a control signal from said wireless-base station in the link layer in a state different from the active state.

* * * * *